US009383270B1

(12) United States Patent
Galambos et al.

(10) Patent No.: US 9,383,270 B1
(45) Date of Patent: Jul. 5, 2016

(54) SILICON FORCE SENSOR

(71) Applicant: Sandia Corporation, Albuquerque, NM (US)

(72) Inventors: Paul C. Galambos, Albuquerque, NM (US); Thomas B. Crenshaw, Albuquerque, NM (US); Erik E. Nishida, Albuquerque, NM (US); Damon J. Burnett, Sandia Park, NM (US); Jeffrey W. Lantz, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 230 days.

(21) Appl. No.: 14/064,573

(22) Filed: Oct. 28, 2013

(51) Int. Cl.
*G01L 1/22* (2006.01)
*G01L 1/18* (2006.01)
*G01L 5/00* (2006.01)

(52) U.S. Cl.
CPC ............... *G01L 1/18* (2013.01); *G01L 5/0028* (2013.01)

(58) Field of Classification Search
CPC .................................. G01L 3/24; G01L 5/161
USPC ............................................ 73/862.045, 862
See application file for complete search history.

(56) References Cited

U.S. PATENT DOCUMENTS

2006/0179951 A1*   8/2006   Birkelund ............. G01L 9/0054
                                                              73/727
2011/0209553 A1*   9/2011   Crivelli ................. G01L 9/0052
                                                              73/721

OTHER PUBLICATIONS

D. Y. R. Chong, "Mechnical Characterization in Failure Strength of Silicon Dice", Thermal and Thermomechanical Phenomena in Electronic Systems, ITHERM. vol. 2, pp. 203-210 (2004).

* cited by examiner

*Primary Examiner* — Lisa Caputo
*Assistant Examiner* — Nigel Plumb
(74) *Attorney, Agent, or Firm* — Medley, Behrens & Lewis, LLC; Aman Talwar

(57) ABSTRACT

The various technologies presented herein relate to a sensor for measurement of high forces and/or high load shock rate(s), whereby the sensor utilizes silicon as the sensing element. A plate of Si can have a thinned region formed therein on which can be formed a number of traces operating as a Wheatstone bridge. The brittle Si can be incorporated into a layered structure comprising ductile and/or compliant materials. The sensor can have a washer-like configuration which can be incorporated into a nut and bolt configuration, whereby tightening of the nut and bolt can facilitate application of a compressive preload upon the sensor. Upon application of an impact load on the bolt, the compressive load on the sensor can be reduced (e.g., moves towards zero-load), however the magnitude of the preload can be such that the load on the sensor does not translate to tensile stress being applied to the sensor.

20 Claims, 14 Drawing Sheets

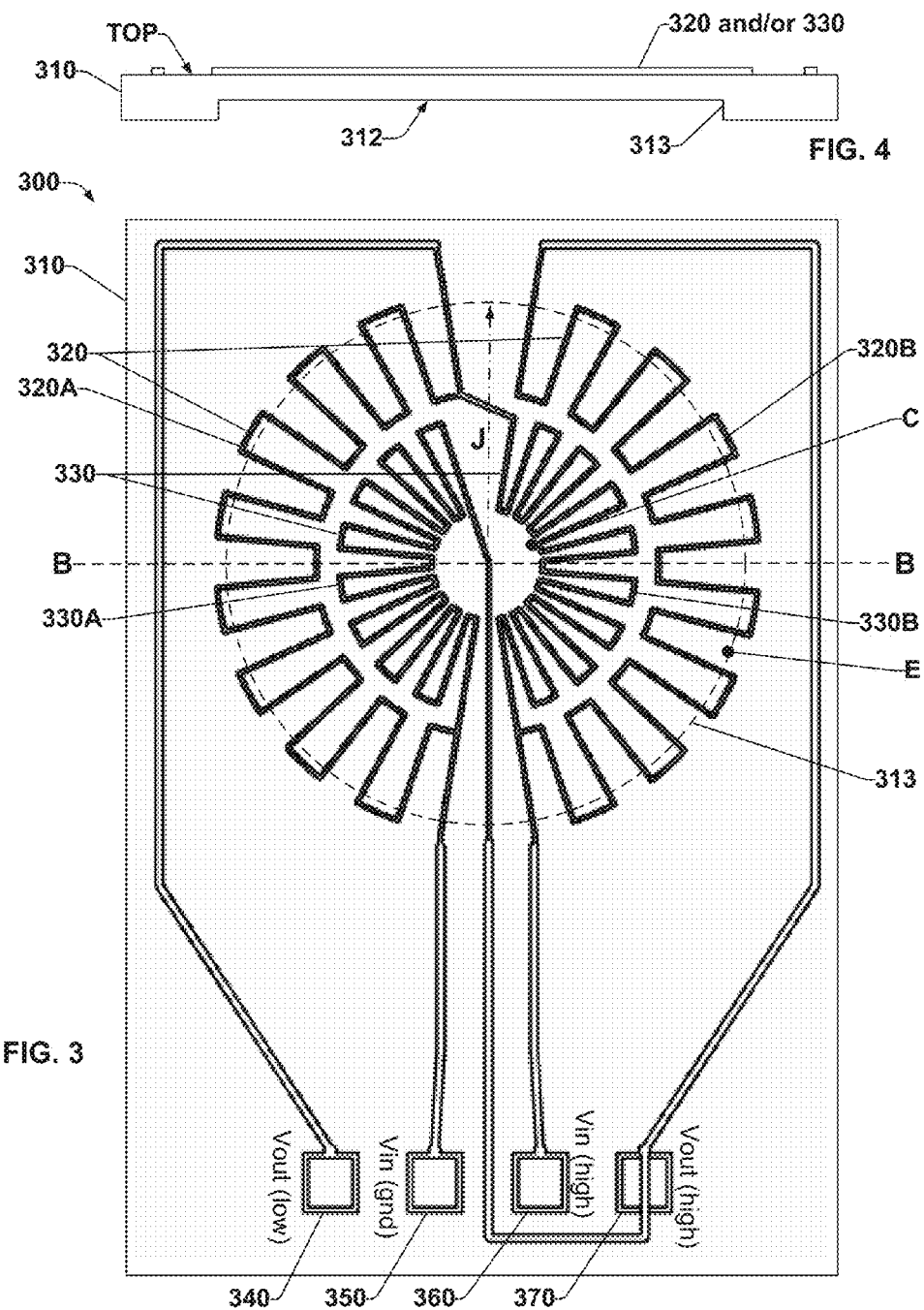

SILICON FORCE SENSOR

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Designing sensors that can measure and survive shock loads in extremely harsh real-world environments, while still providing a high signal to noise (S/N) ratio and significant bandwidth, can be difficult. Further, a small sensor form factor (e.g. a microelectromechanical systems (MEMS) sensor) can be necessary to prevent the sensor deleteriously affecting the structure under load, while facilitating arrayed and embedded applications. Possible applications for a very small sensor that can survive high shock loads and provide a high S/N ratio with a high bandwidth can include crash-test dummy instrumentation, impact forensics, embedded sensors in smart surfaces for lifetime structural health monitoring, etc. Such sensors can indicate when a structural element (e.g., an aircraft wing, a bridge pylon, etc.) has experienced an out-of-bounds load due to an extreme event (e.g., an explosion, an earthquake, etc.). A small sensor can also find application measuring a system response to impact loads, as well as for validating modeling and simulation tools.

There are three main types of normal load (pressure) sensors: capacitive, piezoelectric, and piezoresistive. Each type has performance and manufacturing advantages and shortcomings associated therewith. Capacitive sensors typically have a very small signal (e.g., change in capacitance) relative to the overall sensor capacitance associated with the complete circuit. Accordingly, a parasitic capacitance associated with signal lines on a chip separated from a chip ground by a thin oxide layer can be difficult to avoid as the ground is intimately connected to the sensing element. Such factors tend to reduce the signal to noise ratio for a capacitive sensor. Further, tight tolerances on the small sensing capacitor gap can also be problematic as a very small gap is desirable to achieve higher sensitivity, however a very small gap can limit a range of gap deformation and further lead to an increase in sensor response signal variability as a function of dimensional variability of the gap.

Piezoelectric sensing elements are typically quartz crystals which require poling and assembly, including bonding of the crystal into an electronic package. Recent advances in the fabrication of piezoelectric thin films are facilitating monolithic fabrication of piezoelectric sensors with a reduction in the reliance on adhesives at the critical sensing element level. An advantage of piezoelectric sensors is that they can generate an output voltage with no input voltage required, although an input voltage is required for any in-package signal amplification or processing electronics. However, piezoelectric sensors lack a robustness required to survive dynamic shock loads of a high magnitude.

Typically a DC signal (e.g., a low frequency response) is not sensed in a piezoelectric sensor, while it can be for a piezoresistive sensor. Additionally, monolithic fabrication techniques for piezoresistive silicon (Si) sensing elements are well developed. Si has a large piezoresistive gage factor, can be mass-fabricated, has a high elastic modulus and possesses a high ultimate strength in uniaxial compression. However, Si is a brittle material with tensile and flexural strengths being much lower in comparison with its compressive strength performance. Such material properties can render measurement of highly dynamic loads problematic with a Si sensor material. An application which can be particularly problematic is where dynamic loading can induce tensile stress waves into structural components which can lead to the generation of microcracking in the Si sensor material.

SUMMARY

The various, exemplary, non-limiting embodiments presented herein relate to a sensor which can measure and survive shock loading while still providing a high signal/noise ratio with significant bandwidth are presented. In an exemplary, non-limiting embodiment, a load sensing system can comprise a load sensor comprising a piezoresistive sensor. The load sensing system can further comprise a load application component configured to locate the load sensor on a supporting structure. In a further embodiment, the load application component can apply a compressive preload to the load sensor, wherein the compressive preload results in application of a compressive load to the piezoresistive sensor. And in a further embodiment, while under an operational load, the load application component can effect a relaxation in the compressive load on the piezoresistive sensor.

A further exemplary, non-limiting embodiment comprises a method for measuring a load while providing a high signal/noise ratio with significant bandwidth. The method can comprise applying a compressive preload to a piezoresistive device, wherein the compressive preload is greater in magnitude than an operating range of operational loads. The method can further comprise transmitting an operational load within the operating range to the piezoresistive device so as to produce a reduction in the compressive preload. The method can further comprise measuring the reduction in the compressive preload to facilitate determining a magnitude of the operational load.

A further exemplary, non-limiting embodiment comprises a load sensing system, wherein the system can comprise a load sensor comprising at least one piezoresistive sensor, a first washer, and a load application component. In an embodiment, the load application component can comprise a nut and bolt, the bolt comprising a bolthead, a boltshaft and a threaded portion of the boltshaft. The load application component can be configured to locate the load sensor and the first washer on a supporting structure, wherein the bolt is located in a hole extending from an outer surface of the supporting structure to an inner surface of the supporting structure. The bolt can be located such that the bolthead is situated proximal to the outer surface and the boltshaft extends through the hole beyond the inner surface. In an embodiment, the first washer can be situated between the bolthead and the outer surface. The load application component can be further configured to apply a compressive preload to the load sensor by tightening the nut on the boltshaft, resulting in application of a compressive load to the at least one piezoresistive sensor. In an embodiment, the compressive load can generate a first voltage state at the at least one piezoresistive sensor. The load application component can be further configured to receive an operational load on the bolthead. The operational load can cause a compression of the washer and the operational load can be transferred along the boltshaft causing a relaxation in the compressive preload on the load sensor. In an embodiment, the relaxed compressive load can generate a second voltage state at the at least one piezoresistive sensor.

The above summary presents a simplified summary in order to provide a basic understanding of some aspects of the systems and/or methods discussed herein. This summary is

BRIEF DESCRIPTION OF THE DRAWINGS

FIG. 3 is a schematic of a sensing element, according to an embodiment.

FIG. 4 is a sectional view of a sensing element, according to an embodiment.

DETAILED DESCRIPTION

Figure 1:
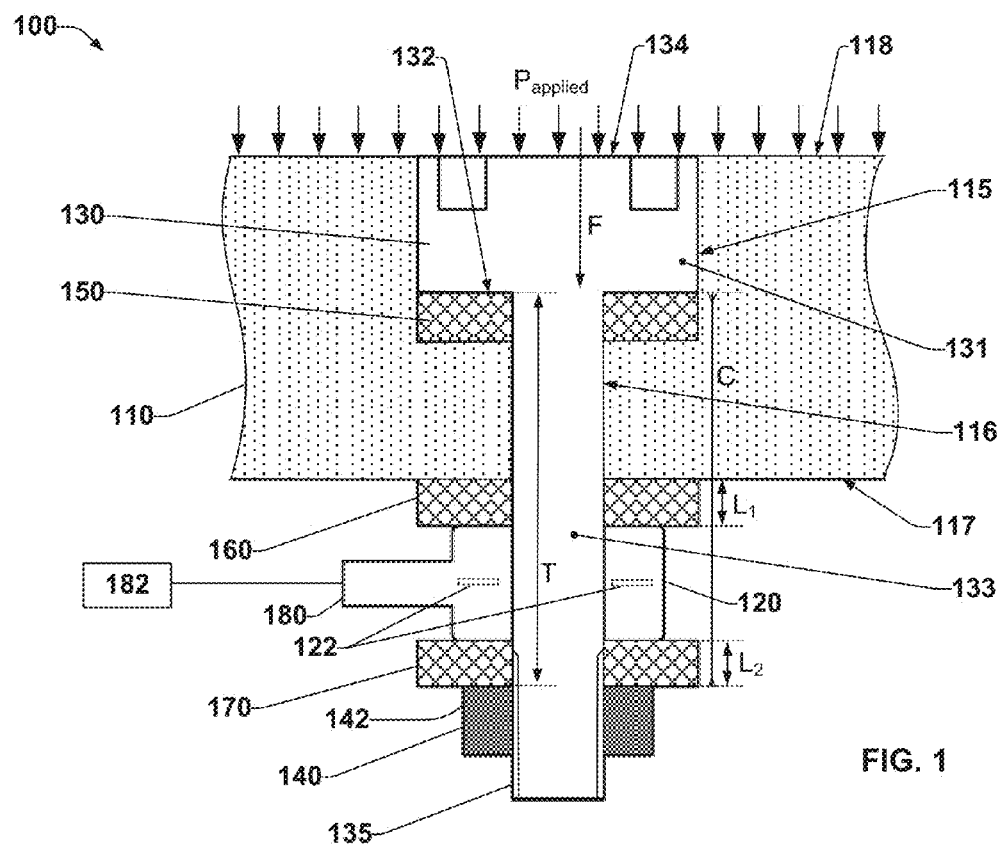
FIG. 1 is a sectional view of a sensor system, according to an embodiment.

Various technologies pertaining to a sensor which can measure and survive shock loading while still providing a high S/N ratio with a significant bandwidth are presented, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to a sensor configured to measure high magnitude forces over a wide bandwidth, where such forces can range from static loading through repetitive loading extending to frequencies of several hundred kilohertz (kHz) or more. In an embodiment, the sensor can be configured as a washer-like device and can include at least one embedded piezoresistive sensing element (e.g., a MEMS based sensor). In a further embodiment, the sensing element can be formed from Si. A Si sensing element can be fabricated to include a photolithographically patterned strain gage(s) on a deformable sense plate to provide a high sensitivity linear response (e.g., about 1-10 mV/1000 lbf, i.e., about 0.2-2 mV/kN) to input loads of up to about 10,000 lbf (about 45000 N). The patterned strain gages, or 'wires' facilitate operation of the sensor as a bridge circuit to generate a measurable voltage difference. As described herein, a range of sensors can be fabricated to operate over a range of applied loads by implementing relatively simple design changes, for example, changing the diameter of a sense plate region, changing the thickness of a sense plate region, etc. Small Si sensing elements (e.g., of about 10 μm to about 100 μm in diameter) enable multiple sensors to be embedded in a washer-like device to facilitate redundant load measurement and further enable a determination of loading direction (e.g., off-axis, angled or side loads) by comparing outputs from sensors at different locations on the washer.

Readily available non-brittle engineering materials having ductile and/or compliant properties can be utilized to package the Si sensor die(s) in a layered material stack arrangement that can protect the brittle Si to facilitate survival of impact loads of a high magnitude(s) For example, the enclosing materials can act to dampen undesirable high frequency signals that may cause damage to the Si and associated components. Such materials can include glass-reinforced epoxy laminate sheets (e.g., a printed circuit board, PCB), copper (Cu), polyimide, aluminum (Al), steel, etc. A low-level (micro-) compressive preload can be applied to the sensor to ensure that any gaps in the material stack are closed. Prior to operation a high level (macro-) compressive preload can be applied the sensor system including the Si sensing element. The magnitude of the macro-preload may be selected, e.g., such that irrespective of the operational loading on the sensor system, the Si sensing element will always experience compressive loading.

The sensor design(s) facilitates control of a stress level at the Si sensor die and thus the effective load range of the sensor, while maintaining a high S/N ratio (e.g., of greater than about 100:1). Further, the various sensor designs presented herein are amenable to scalable manufacturing, take advantage of the high sensitivity and high compressive strength of Si, and they facilitate integration of the sensor with other sensors and actuators as part of a complete impact response system. Further, owing to application of a piezoresistive sensor, sensor response is typically linear (e.g., as compared with a quadratic response for a capacitive sensor), whereby the linear response can ease calibration and electronic signal conditioning.

Figure 2:
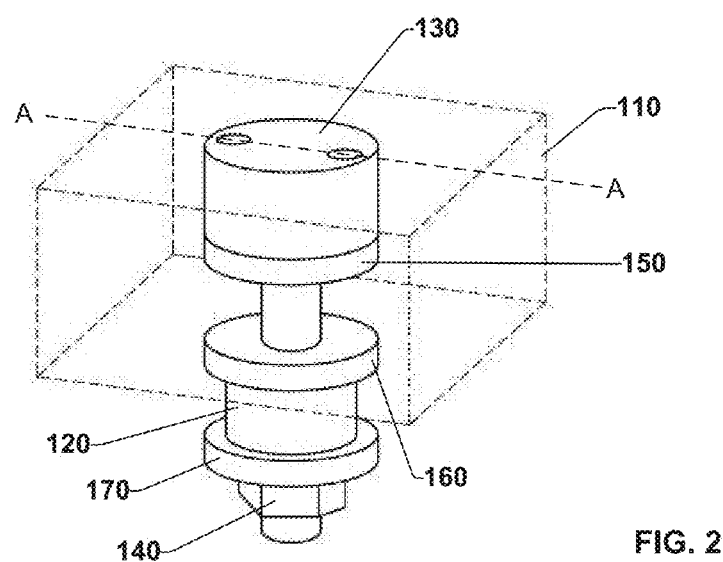
FIG. 2 is three dimensional view of a sensor system according to an embodiment.

FIGS. 1 and 2 illustrate a load sensing apparatus 100 in accordance with various non-limiting embodiments, where FIG. 1 illustrates a vertical section through A-A and FIG. 2 presents a three dimensional (3D) representation. As shown in FIGS. 1 and 2, a supporting structure such as a bolt 130 and nut 140 can be utilized to locate a load sensor 120 on a housing 110. In an aspect, the housing 110 can be a wall, a panel, a skin, a frame, or other structure of a device into which the load sensor 120 can be incorporated.

Figure 5:
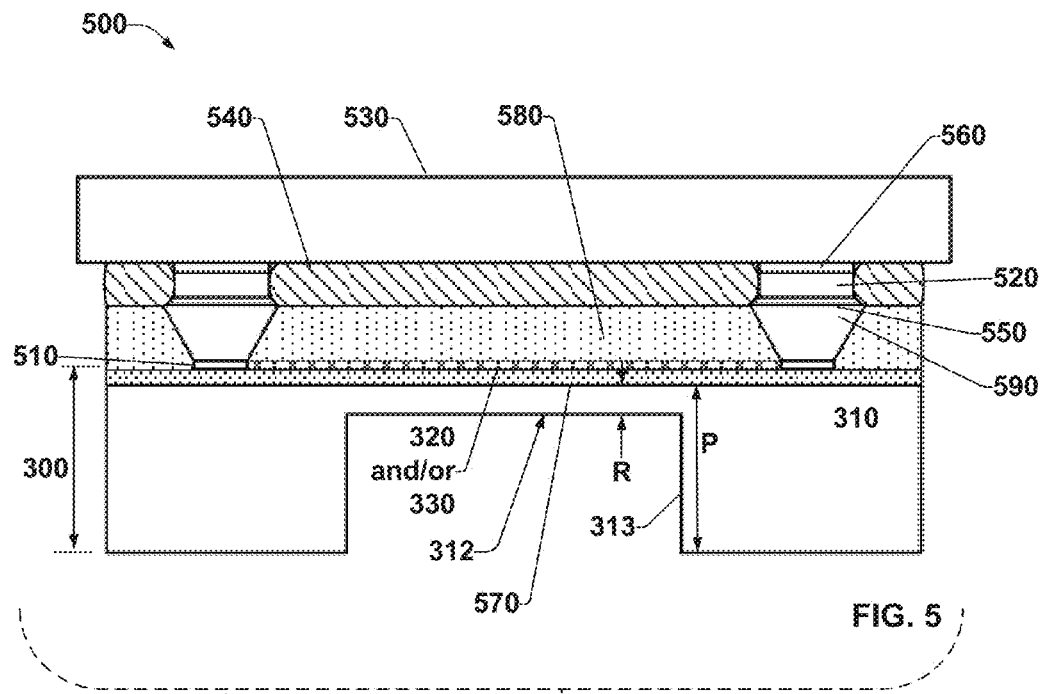
FIG. 5 is a sectional view of a sensor assembly which includes a sensing element, according to an embodiment.

As also shown in FIG. 1, at least one sensing element 122 can be located inside the load sensor 120, with design and operation of the sensing element(s) 122 described further herein, particularly with reference to FIGS. 3, 4, and 5. The bolt 130 comprises a bolthead 131, a boltshaft 133 and a threaded portion 135 of the boltshaft 133 onto which the nut 140 can be attached (e.g., nut 140 can be threaded onto the boltshaft 133). Bolt 130 is located in a hole 116 formed (e.g., drilled) in the housing 110, with the boltshaft 133 and the threaded portion 135 located in the hole 116. The bolthead 131 is located in a recess 115 formed in the housing 110 about the hole 116 (e.g., recess 115 is a countersunk hole). In an embodiment, the bolthead 131 can be situated proximal to an outer surface (or sidewall) 118 such that a load (e.g., $P_{applied}$ as further described herein) applied to the outer surface 118 also acts, in part, on the bolthead 131. The base of the recess 115 acts to retain the bolthead 131 while the boltshaft 133 extends through the hole 116 and protrudes from an inner sidewall (or surface) 117 of the housing 110 opposite to the recess 115. Load sensor 120 having a washer-like configuration can be located on boltshaft 132. Nut 140 can be utilized to locate the sensor 120 against the inner sidewall 117. Such locating of sensor 120 against the inner sidewall 117 by nut 140 may be performed, e.g., by tightening nut 140. The tightening of nut 140 can further act to apply tension T on bolt 130 which locates bolthead 131 in recess 115. Electrical connection to the sensing elements 122 can be via connector 180, with signals (e.g., a change in voltage applied to the at least one sensing element 122) being transmitted and/or received by load measuring system 182. Based on electrical changes at one or more sensing elements such as element 122, a state of the at least one sensing element 122 can be determined, such as the difference between a first state (e.g., a preloaded state) and a second state (e.g., under impact loading). For example, an impact load can cause a relaxation in the preloaded state of a load sensor 120 (as further described below) and the one or more sensing elements, such as element 122, can include a Wheatstone bridge, whereby the change from the first loading state to the second loading state causes a change in voltage across the Wheatstone bridge. The Wheatstone bridge facilitates measurement of the load on a sensing element 122 by balancing the resistance in two legs of the bridge circuit.

It is to be appreciated that the term 'locate' is utilized herein to convey positioning and/or attachment of a component, e.g., a first component relative to a second component. For example, the first component can be located adjacent to the second component. In another example, the first component can be located with reference to the second component, hence, while the first component and second component may not be adjacent or touching, the second component (e.g., load sensor 120) may be located with reference to a first component (e.g., any of an inner sidewall 117, recess 115, hole 116, etc.), where the second component is separated from the first component by a third component (e.g., any of washers 150, 160, or 170 as further described below).

Figure 22:
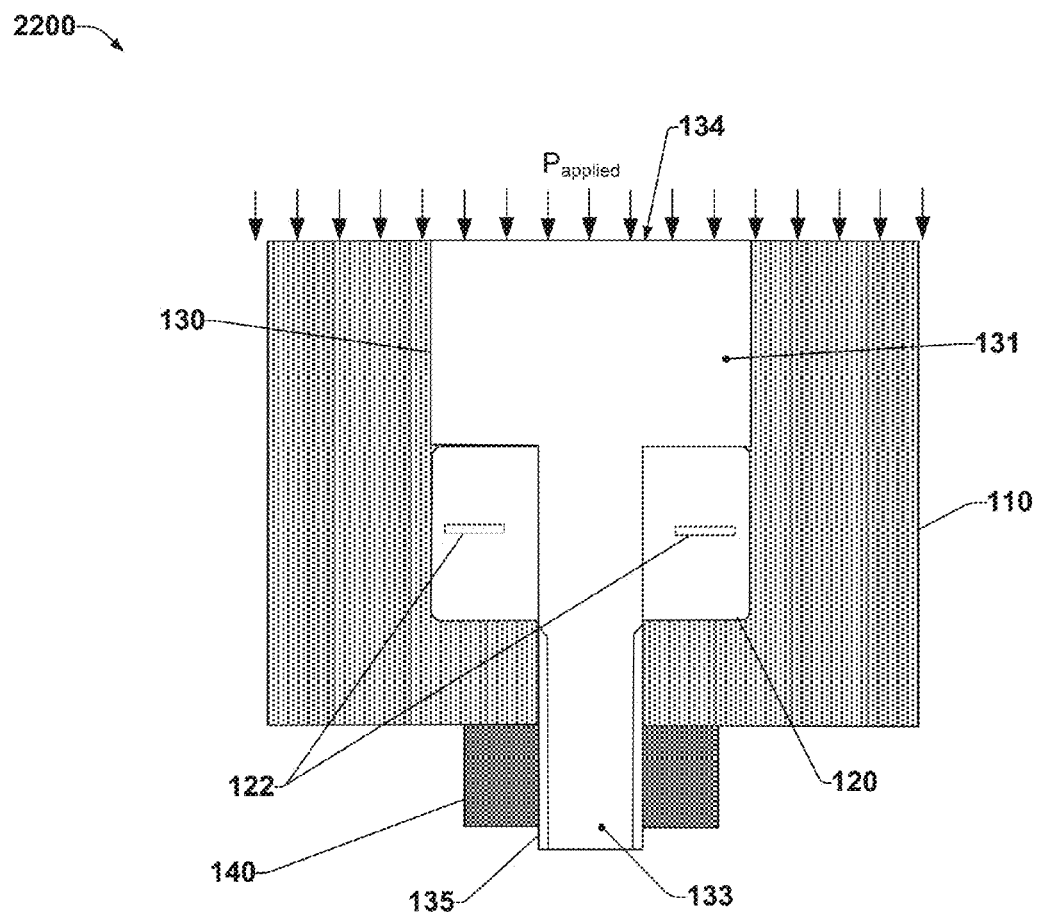
FIG. 22 is a sectional view of a sensor system, according to an embodiment.

In an embodiment, rather than placing the load sensor 120 under direct compressive loading (e.g., the load sensor is located between the nut 140 and the housing 110, as shown, e.g., in FIG. 22), a plurality of gapping components, e.g., washers 150, 160 and 170 can be utilized to apply a compressive preload, $P_{preload}$, to the load sensor 120. Application of a preload can facilitate linearization of the response of load sensor 120 as a function of a reduction in the compressive loading of the sensing element(s) 122 located inside the load sensor 120, as further described herein. In an embodiment, washer 150 can be located, i.e., situated, in the recess 115 between the bolthead 131 and the bottom of the recess 115. Washers 160 and 170 can be located on boltshaft 133, e.g., washer 160 can be located between the load sensor 120 and sidewall 117, while washer 170 can be located between the load sensor 120 and the nut 140, as illustrated in FIG. 1.

Washers 150, 160 and 170 can be formed from a material having a ductile and/or compliant nature such that during application of either of $P_{preload}$ or $P_{applied}$, a load (e.g., $L_1$ at washer 160 and $L_2$ at washer 170) is maintained on load sensor 120, where such materials include, in a non-exhaustive list, Cu, Al, polyimide, steel, PCB, etc. Washers 150, 160 and 170 can be formed from a resilient material, per the above, which can have a degree of elastic recovery such that as a load is intermittently placed on any of washers 150, 160 or 170, the washer can be compressed and upon removal of the intermittent load the washer can expand back to, or near to, an original size, thereby compensating for the various dimensional changes in structure 100 as the load is applied and removed.

A high degree of damping can increase a load survivable by load sensor 120, but typically (e.g., with a conventional load sensor) such damping can lead to a reduction in the bandwidth, where bandwidth herein relates to the frequency range and/or highest frequency being measured during loading. Accordingly, the configuration illustrated in FIGS. 1 and 2 facilitates protection of the load sensor 120, whereby any of the washers 150, 160 and/or 170, in conjunction with the bolt 130 and nut 140, can act to absorb a damaging portion of an impact load $P_{applied}$ while imparting a known portion of the load $P_{applied}$ through the load sensor 120 (and accordingly any sensing element(s) 122 included therein).

In an embodiment, a macroscopic preload can be applied to the load sensor 120 (and accordingly any sensing element(s) 122 included therein) based upon tightening of nut 140 along bolt thread 135. In another embodiment, a microscopic preload can be applied to a sensing element 122 based upon fabrication of the load sensor 120, as further described herein.

During preloading, $P_{preload}$, of the load sensor 120, tightening of nut 140 along bolt thread 135 can place the load sensor 120 and washers 150-170 under compression loading C, and accordingly place the bolt 130 in a state of preload tension T, with the compressive and tensile loading being respectively applied by the shoulder 132 of bolt 130 and working face 142 of nut 140. During operation, application of an impact load, $P_{applied}$, on the exposed upper surface 134 of bolthead 131, e.g., in direction F, can act to reduce the preload tension T in the bolt 130 and thereby reduce the $P_{preload}$ compression C on the load sensor 120. In an embodiment, if a transmitted portion of the impact load $P_{applied}$ does not exceed the $P_{preload}$ compression C applied to the load sensor 120, the load sensor 120 (and accordingly any sensing element(s) 122 included therein) can survive application of impact load $P_{applied}$ as the load sensor 120 has already withstood the more controlled (e.g., low loading rate) application of $P_{preload}$.

For example, sensing element(s) 122 can always be in a state of compression, or near compression, where in an example if $P_{preload}$=10000N, and $P_{applied}$=4700N, the sensing element 122 is still experiencing a compressive load of 5300N. Furthermore, in another embodiment, the application of $P_{preload}$ can also ensure that the load sensor 120 is in a state of compression of sufficient magnitude to facilitate linear response of the load sensor 120 during application of the impact load $P_{applied}$. Effectively, application of the $P_{preload}$ can remove any gaps or looseness in the hardware stack (e.g., components 110, 120, 130, 140, 150, 160, and 170, and also components included in sensor 120 as described below) resulting in a tight component assembly that can smoothly transmit a portion of the impact load $P_{applied}$ to the load sensor 120 (and accordingly any sensing element(s) 122 included therein). In an aspect, it can be considered that there are two levels of protection, the microscopic compressive preload applied to the sensor 120 and sensing element(s) 122 located in load sensor 120, and the macroscopic compressive $P_{preload}$ applied to the load sensor 120 and the portion of the $P_{preload}$ acting to maintain the hardware stack tightly coupled.

In an embodiment, one or more sensing elements 122 can be incorporated into a load sensor 120 to facilitate load measurement as previously described with reference to FIGS. 1 and 2. FIGS. 3 and 4 illustrate a design for a sensing element 300 (which can be considered to be equivalent to sensing element 122), according to an embodiment, where FIG. 4 is a sectional view along B-B. The sensing element 300 can be formed from a plate 310 of material, which may, e.g., be single crystal Si.

In an example, the thickness of plate 310 can be on the order of about 100 μm thick to facilitate high load measurement. Further, the thickness of the plate 310, or a portion thereof, can be thinned (e.g., to a thickness of about 10 μm) by any suitable technique such as an etch process (e.g., a Bosch etch), where the broken line 313 on FIG. 3 indicates the location of the sidewalls 313 of a thinned region 312 on FIG. 4.

Alternatively, plate 310 can be constructed using silicon on insulator (SOI) device technology, whereby a wafer can be obtained of a required thickness with and/or without the thinned region 312. A surface (e.g., a top, or upper, surface in the plane of the illustration of FIG. 3) of plate 310 can be patterned with at least one trace, e.g., traces 320 and/or 330, as shown in FIG. 4. As presented further herein, traces 320 and 330 can be formed from four separate traces 320A and 320B, and 330A and 330B, where traces 320A and 320B are located relative to the periphery of thinned region 312, and traces 330A and 330B can be located more centrally relative to the thinned region 312.

As explained further herein, when a load (e.g., $P_{preload}$ or $P_{applied}$) is applied to and/or distributed across the top surface of the plate 310, plate 310 can become deformed (e.g., by bending) about the thinned region 312. Accordingly, deformation of plate 310 can lead to strain transduction occurring in the traces 320 and 330 on the top surface of the plate 310, where in where in typical configurations the highest strain tends to occur. While the traces 320 and 330 can be of any dimension and form, in an embodiment the traces 320 and 330 can be formed from any suitable conductor such as doped (e.g., greater than about $1 \times 10^{26}$ cm$^{-3}$) n-type polysilicon and can be of any suitable dimension, e.g., about 0.3 μm, in width and height. In a further embodiment, traces 320 and/or 330 can be isotropic. In another embodiment, traces 320 and/or 330 can have a piezoresistive gage factor coefficient of about −18.

As shown in FIG. 3, the traces 320A, 320B, 330A and 330B can form a serpentine pattern repeatedly crossing back and forth over the thinned region 312 of the plate 310 that can experience the highest radial strain during deformation of the plate 310.

In an embodiment, the traces 320A, 320B, 330A and 330B can be arranged as a full Wheatstone bridge, in which a plurality of bridge resistance connections 340-370 are collectively patterned on the surface of plate 310. Patterning the plurality of bridge resistance connections 340-370 onto the surface of plate 310 can mitigate any temperature variation effects as all the resistive legs (e.g., traces 320A, 320B, 330A and 330B) of the Wheatstone bridge can be subject to the same temperature and thermal boundary conditions. Further, patterning the plurality of bridge resistances 340-370 onto the surface of plate 310 can also maximize sensitivity as the opposing resistor pairs 340 & 350 and 360 & 370 in the Wheatstone bridge can be subject to either tension (outer resistors 340 and 370 located at the edge of plate 310) or compression (inner resistors 350 and 360 located at the center of plate 310). Patterning the plurality of bridge resistances can cause differences in resistance due to strain to increase the change in voltage, rather than offset it. In embodiments, the Wheatstone bridge does need to be balanced. Obviating such a need can facilitate monitoring the offset (e.g., at outputs 340 and 370) for problems associated with electrical design, circuit connections, input/output electrical connections, and the like. It is to be appreciated that any suitable resistance can be utilized to facilitate operation and sensing by the Wheatstone bridge (e.g., traces 320A, 320B, 330A and 330B), in an embodiment, a resistance of each leg of the bridge can typically be in the order of tens of kilohms.

While not shown in FIGS. 3 and 4, a layer of insulating film (e.g., silicon dioxide (SiO$_2$), and/or silicon nitride (SiN) layer 570 shown in FIG. 5) can be deposited between the traces 320 and 330 and the surface of plate 310 to prevent shorting. Further, while not shown in FIGS. 3 and 4, a layer of insulating film (e.g., layer 580 in FIG. 5) can also be applied to cover the surface of the traces 320 and 330 to provide a measure of wear protection.

As previously mentioned, the brittle sensing element 300 can be packaged to protect the sensing element from the most extreme loads and can further transmit a percentage of the applied load to the die 310. Protection afforded by sensor packaging enables the sensor element 300 survive the high loads and loading rates. FIGS. 5-11 provide illustration of various packaging embodiments and a testing configuration, and are presented to facilitate understanding of calibration of an applied load to a measured sensor response. Based thereon, various predictions can be made regarding a transfer function through a sensor package for an anticipated load level(s) for the various materials, stiffness, and thicknesses chosen in the package design. The various calibration curves, applied loads, FEM analyses, sensor dimensioning, material selection, etc., are presented to facilitate understanding of the various concepts presented herein and are not to be taken as definitive values, with any parameter magnitude, material, dimension, etc., being replaceable by any other value suitable in accordance with the embodiments presented herein. Hence, the parameter magnitude(s), material(s), dimension (s), etc., can be selected to facilitate design of a sensor, and adjusted for different anticipated loads in different sensor applications.

FIG. 5 illustrates a sensor assembly 500 which includes a sensing element 300, according to an embodiment. As illustrated, a plate 310 has located thereon traces 320 and 330, as previously described in FIGS. 3 and 4. Thinned region 312 indicates where material has been removed (e.g., by Bosch etching) to facilitate thinning of plate 310 to a thickness R which is less than the original thickness P of plate 310.

In an embodiment, the thinned plate region 312 can increase the degree of deformation which can occur at that region relative to a plate with a constant thickness P throughout.

Electrical connection to traces 320 and/or 330 is facilitated by electrical contacts 510 which can be connected to a printed circuit board (PCB) 530 via electrical contacts 520 and 590, bond pads 550 and trace elements 560. In an embodiment, the bond pads 550 can be formed from any suitable material, e.g., aluminum. In an embodiment, trace elements 560 can be formed on the PCB 530, and further can be formed from any suitable conductive material, e.g., gold. In an embodiment, electrical contacts 590 can be solder bumps and in a further embodiment, electrical contacts 520 can be a die attach, formed, for example, from indium (In). As previously mentioned, traces 320 and/or 330 can be optionally located between a lower insulating layer 570 and/or an upper insulating layer 580. Further, an adhesive layer 540 can be located between the upper layer 580 and the PCB 530, where adhesive layer 540 can be formed from any suitable material such as an epoxy resin.

Figure 6:
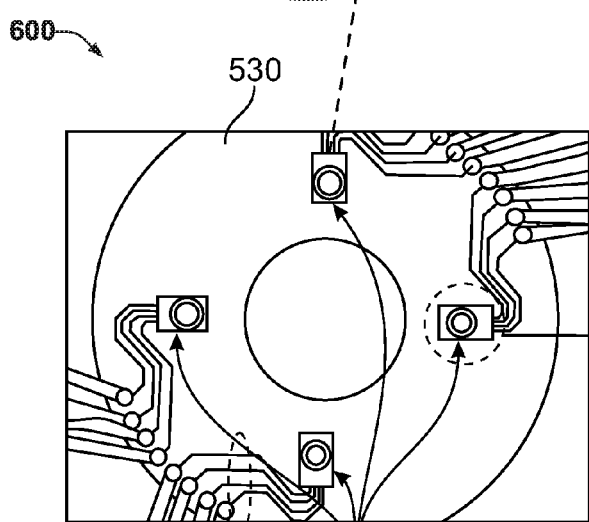
FIG. 6 a photograph illustrating a sensor assembly which includes a plurality of sensing elements, according to an embodiment.

FIG. 6 is a photograph illustrating a sensor assembly 600 which includes a plurality of sensor assemblies 500 (and according sensing elements 300), according to an embodiment. As previously mentioned, the example configuration presented herein relates to a load sensor 120 being located in a compressive loading system comprising a bolt 130 and a nut 140.

Accordingly, as shown in the example configuration, a plurality of sensing elements 300 (e.g., comparable to sensing elements 122 of FIG. 1) can be located on a PCB 530, where in the example embodiment, the PCB 530 is in the form of a washer-like configuration to facilitate location of the load sensor 120 on to the boltshaft 133. In the example configuration presented in FIG. 6, four sensing elements 300 (each located in a sensor assembly 500) are located on PCB 530, whereby readings from each of the four sensing elements 300 can be analyzed and, based thereon, a determination can be made regarding a direction of loading relative to the operating plane of the four sensing elements 300. PCB 530 has further formed thereon a plurality of traces 610 which are connected to respective inputs and/or outputs 340-370.

Figure 8:
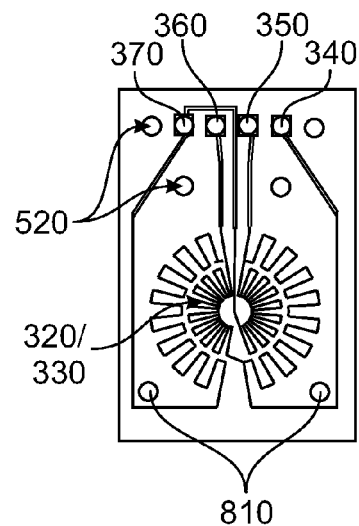
FIG. 8 is a photograph illustrating a sensing element, with a trace located thereon, according to an embodiment.
Figure 7:
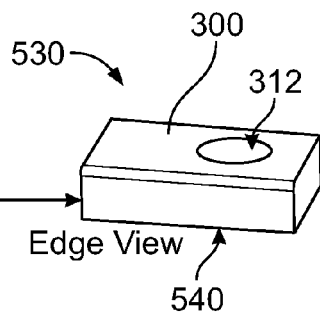
FIG. 7 is a photograph illustrating a side view of a sensing element with an etched cavity, according to an embodiment.

FIG. 7 is a photograph illustrating a side view of a sensing element 300 with the etched cavity 312 readily discernible, according to an embodiment. As shown, each sensing element 300 can be located on PCB 530 by an adhesive layer 540, where during location of a sensing element 300 on to PCB 530 the adhesive layer 540 can wick into a gap formed between the electrical contacts 520 on PBC 530 and the upper oxide layer 580. FIG. 8 is a photograph illustrating a plate 310, with a trace 320 and/or 330 located thereon, according to an embodiment. Further indicated on FIG. 8 are the bridge resistance connections 340-370. Electrical contacts 520 can be utilized to supply and/or measure voltage, etc., as traces 320 and/or 330 undergo loading deformation. Further, additional indium bumps 810 can also be utilized as symmetrical support for electrical contacts 520.

Figure 10:
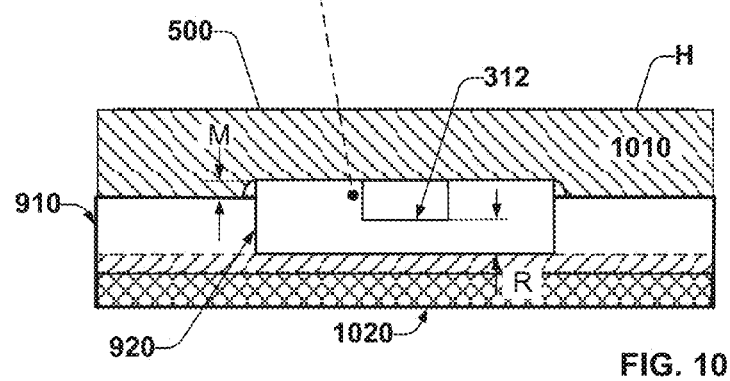
FIG. 10 is a block diagram illustrating a sensor assembly with a portion of the sensor assembly protruding out of a die mount opening, according to an embodiment.
Figure 9:
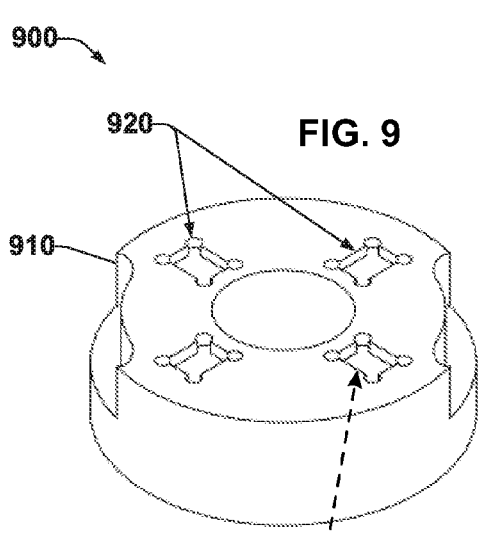
FIG. 9 illustrates a die mount to locate a sensor assembly, according to an embodiment.
Figure 11:
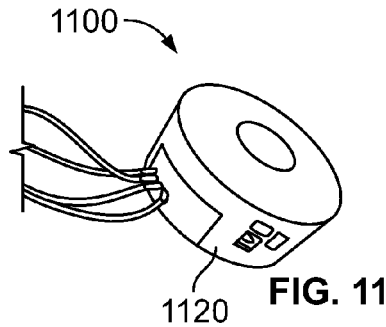
FIG. 11 is a photograph illustrating a load sensor assembly, according to an embodiment.

FIGS. 9, 10 and 11 illustrate example configurations for packaging of a sensor, according to an embodiment. As previously mentioned, the various embodiments presented herein can be directed towards incorporation of one or more sensing elements (e.g., sensing elements 300) into a washer-like configuration. As shown on FIG. 9, a sensor assembly (e.g., sensor assembly 500) can be incorporated into a die mount 910. Die mount 910 can include a plurality of openings 920 (e.g., well cutouts) whereby each opening can be utilized to locate a sensor assembly 500. As shown in FIG. 10, each sensor assembly 500 can be located in the die mount opening 920 such that a portion of the sensor assembly 500 can protrude, by distance M, above the surface H of the die mount 910. Hence, during assembly of a washer assembly (e.g., assembly 1110 shown in FIG. 11), a washer or disc of material 1010 can be placed on the exposed surface of the sensor assembly 500, such that a micro-level preload can be applied to the sensing elements 300 in the sensor assembly 500 which can further cause the washer 1010 to deform over the surface of sensing element 300 by the distance M. In an embodiment, washer 1010 can be formed of a compliant material such as nylon. A second washer 1020 can be placed under the PCB 530 as required to facilitate protection of the sensing element 310.

It is to be appreciated that any number of layers can be utilized during assembly and packaging of a sensing element 300. Hence, once the final washer assembly 1110 is assembled with the sensor assembly 500 and washers 1010 and 1020 located in an outer shell 1120, the sensor assembly 500 and the respective sensing elements 500 can have a micro-level preload applied thereto. During subsequent assembly of the washer assembly 1110 (e.g., forming load sensor 120) into the load sensing device apparatus 100, a further compressive load (e.g., a macro-level preload) can be applied to the sensor assembly 500, whereby the macro-level preload and the micro-level preload can combine to form $P_{preload}$.

To facilitate understanding, the following presents calculations and test data relating to a structure (e.g., sensor assembly 500) fabricated in accordance with the various embodiments presented herein. In an embodiment, a primary change in resistance across the Wheatstone bridge (e.g., traces 320A, 320B, 330A and 330B) can be due to strain being induced at the upper surface of the plate 310. The strain can be induced as a function of the plate 310 being deformed, e.g., bent. In an embodiment, the strain of the upper surface of plate 310 can be maximized at edge region E (e.g., as shown in FIG. 3), where the thinning of region 312 from a thickness P (e.g., thickness of plate 310) to a thickness R, can concentrate strain at region E.

Figure 12:
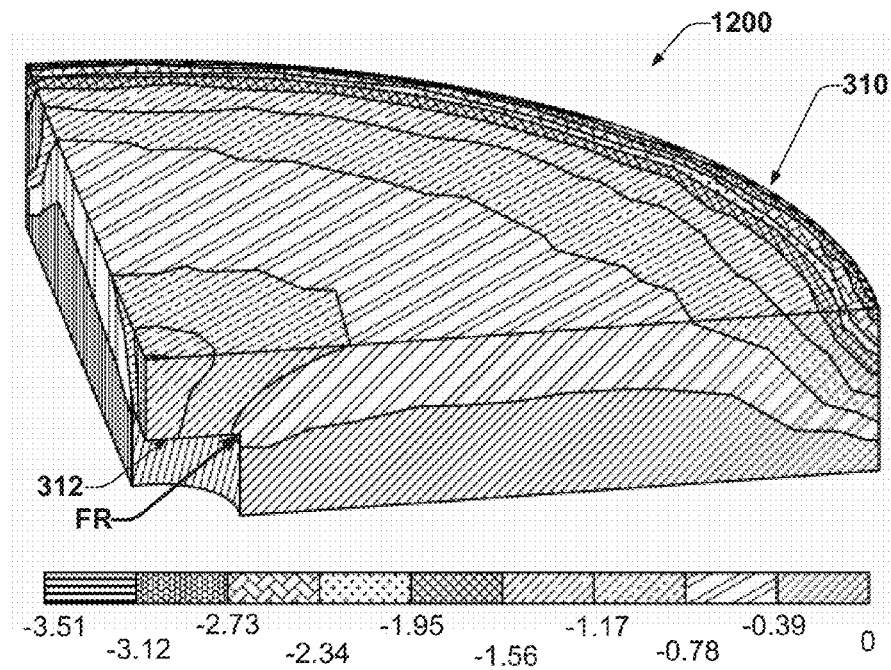
FIG. 12 is a FEM study illustrating strain distribution in a sensing element, according to an embodiment.
Figure 13:
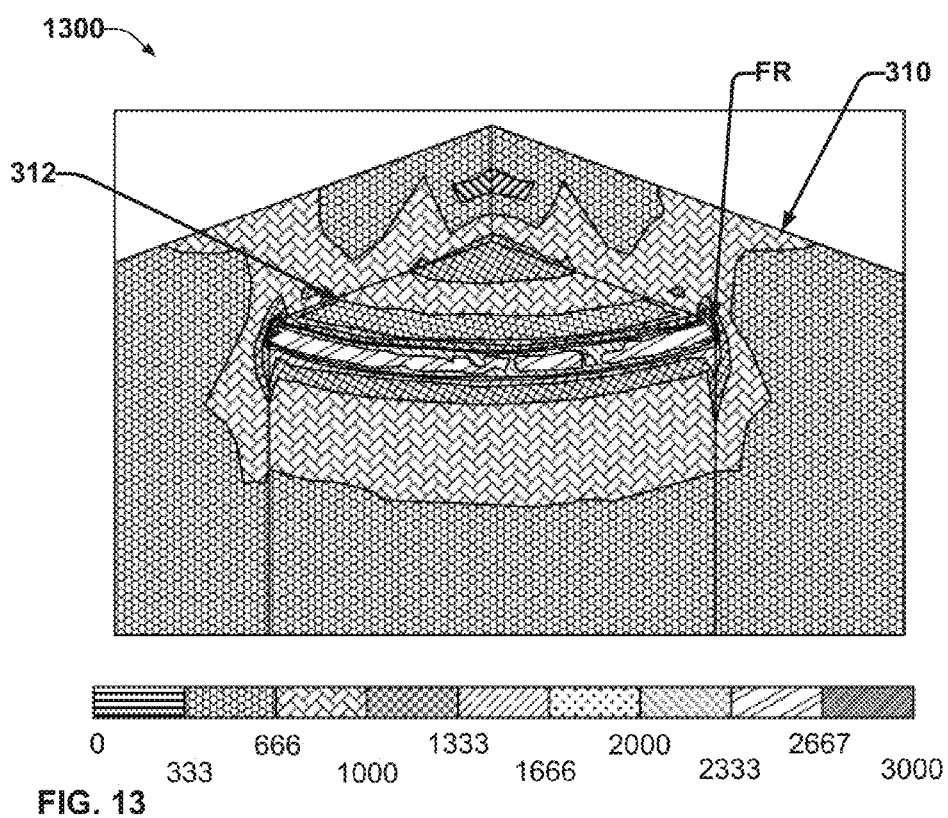
FIG. 13 is a FEM study illustrating strain distribution in a sensing element, according to an embodiment.

Finite element (FEM) studies showing the strain distribution in plate 310, and traces 320 and 330, are presented in FIGS. 12 and 13.

Optical inspection of the thinned region 312 formed by the etching process indicate that the fillet radius (FR) region where the etched plate meets the remainder of the plate 310 was not sharp, but rather had a significant fillet radius estimated at 100 to 200 μm. The effect of fillet radius is further address in FIG. 21.

It is to be appreciated that the solutions can over-predict edge stresses. A load $P_{applied}$ was applied to the sensor in these calculations rather than the fraction of the load that actually is felt by the sensor due to load division between the sensor 310 and the package 910. It is to be noted that the calculation identifies regions of high stress near the edges of the plate in FIG. 12, however such a concentration can be mitigated with a larger fillet. In this solution a distributed load is applied across a quadrant of a circular sensor plate region 312 surrounded by a Si support structure 310. A nylon washer (soft material) covered by a steel washer (stiff material) can be modeled on top of the Si plate (neither the nylon nor steel elements are shown) to incorporate a deforming element and maintain load element contact with the plate 310 as it deforms.

As previously mentioned, the washers (e.g., washers 1010 and 1020) can be considered as a first level of packaging protection for the sensor element 310. The sensor plate 310 can fail (fracture at the edge of the plate) at the loads modeled in FIGS. 12 and 13 due to the relatively low strength of Si in bending, further presented in the design calculations hereinafter. It is to be noted that forming a sensor plate with SOI could result in a sharper FR and hence, may be more closely modeled in accord with FIGS. 12 and 13.

Figure 14:
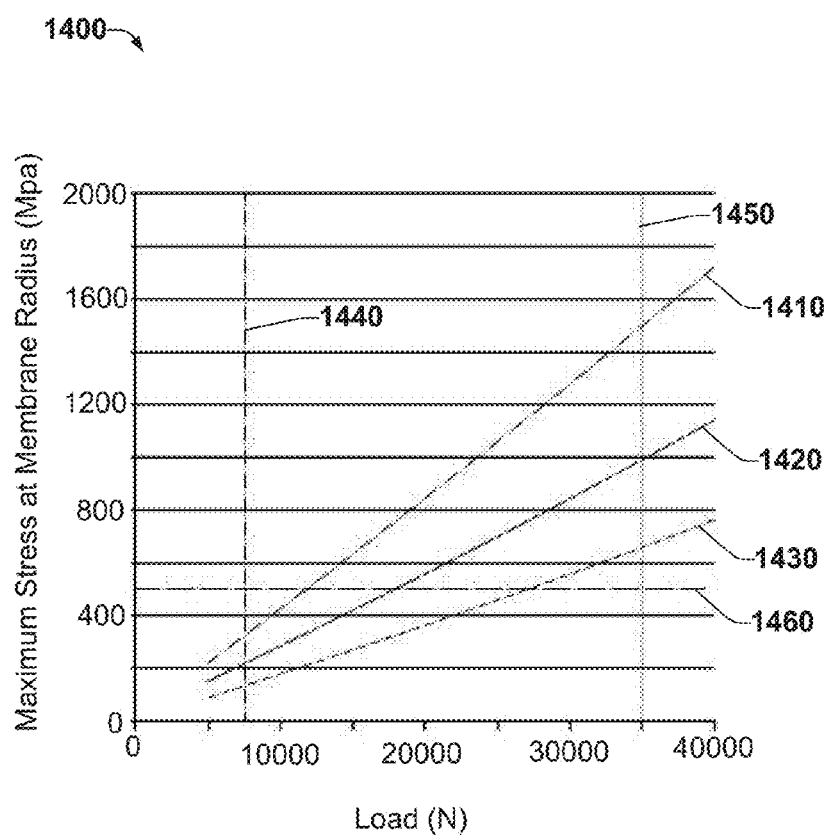
FIG. 14 presents a chart depicting the effect of fillet radii on fracture load, according to an embodiment.

FIG. 14 presents chart 1400 illustrating the effect of fillet radii on fracture load, e.g., in the corner of thinned region 312, according to an embodiment. FEM analysis of fracture load based on maximum stress at membrane radius (plate edge) for different fillet radii are shown, plot 1410 is the determined values for a 50 μm radius, plot 1420 is the determined values for a 100 μm radius, and plot 1430 is the determined values for a 200 μm radius. A calculated fracture load from the example design calculations presented herein is shown in line 1440, while the measured fracture load is shown in line 1450 (note: Si sensor element fractured at load just beyond that shown in FIG. 20).

Further, an approximate fracture strength for Si in bending is shown in 1460. The fracture strength of Si is reached at a low load (~10000 N) for the small radius etch fillet of 50 μm (which is in approximate agreement with the design calculation herein) and at a much higher load (~30000 N) for the large radius etch fillet of 200 μm (which is in approximate agreement with an experimental fracture load, as presented herein). Thus, the results shown in FIG. 12 support utilization of a large etch fillet radius (estimated at about 200 μm) to reduce the stress at the plate edge, increasing the maximum survivable load and decreasing the sensor signal by an amount consistent with the observed experimental results.

To facilitate understanding of the various embodiments presented herein, the following equations are presented. As an approximation, the plate 310 can be considered, in aspect, as a clamped circular plate having a fixed/fixed boundary at the edge E. An analytical expression for maximum stress ($\sigma_R$) at the edge of a clamped circular plate is presented in Eqn. 1:

$$\sigma_R = \frac{3\pi r^2 w}{4\pi t^2} \qquad \text{Eqn. 1}$$

Further, the associated strain ($\epsilon_R$) can be calculated using Young's modulus, according to Eqn. 2:

$$\epsilon_R = \frac{\sigma_R}{E} = \frac{3r^2 w}{4t^2 E} \qquad \text{Eqn. 2}$$

where w is the distributed load (N/m$^2$), E is Young's modulus (N/m$^2$), t is the thickness of plate 312, and r is the plate radius (m). Owing to radial strain having a larger magnitude than a circumferential strain at the edge of the circular plate (e.g., edge E of thinned region 312), Eqns. 1 and 2 can be considered as directed towards radial strain.

Returning to Eqns. 1 and 2 and incorporating a piezoresistive gage factor for highly doped n-type polysilicon (e.g., G=−18), a change in resistance ($\Delta R$) for a given strain ($\epsilon_R$) can be calculated, according to Eqn. 3:

$$\Delta R = GR\epsilon_R \qquad \text{Eqn. 3}$$

Further, an approximate bridge circuit output voltage ($V_{Out}$) as a function of input voltage ($V_{in}$) can be derived for a half bridge design according to Eqn. 4:

$$V_{out} = 2V_{in}\left[\frac{R_1 - R_2}{R_1 + R_2}\right] \qquad \text{Eqn. 4}$$

where $R_1$ is the resistance of the outer trace 320 (e.g., traces 320A and 320B) and $R_2$ is the resistance of the inner trace 330 (e.g., traces 330A and 330B), according to FIG. 3.

With reference to FIG. 3, for the sensor design the resistances of the two outer traces 320A and 320B can be made equal to each other and the resistances of the two inner traces 330A and 330B can be made equal to each other. Accordingly, the sensor design can be approximated as Wheatstone half-bridge circuits owing to the shorter center of the trace 320 resistors, while under compressive loading, and hence can experience less strain and contribute less change in resistance than the longer edge of plate resistance traces 330 may do.

For a simple circuit design, the input ground 350 and $V_{output}$ 340 and/or 370 can be connected to minimize noise, according to FIG. 3, which can effectively create a voltage divider circuit. For a voltage divider circuit the change in output sense voltage for a given change in resistance (in this case due to strain at the edge of the plate (according to Eqn. 3)) can be derived according to Eqn. 5:

$$\Delta V_{out} = \frac{R_2}{(R_1 + R_2)^2} V_{in} \Delta R_1 \qquad \text{Eqn. 5}$$

As previously mentioned, the materials in package 1110 surrounding the sensor assembly 500 can protect the sensing element(s) 300 from the most extreme loads and can transmit a percentage of the load $P_{applied}$ to the sensing element(s) 300. All of this protection enables a sensor assembly 500 (and associated components) to survive high loading of a high frequency.

However, the relationship between applied load to a measured sensor response is required to be known, e.g., for calibration purposes. Accordingly, knowledge is required to be able to predict the transfer function of the anticipated load levels (e.g., $P_{applied}$ and/or $P_{preload}$) through the materials, stiffness, and thicknesses chosen in the design of any of sensor assembly 500, sensing element(s) 300, washer assembly 1110, etc. Based on such knowledge, various design parameters can be established and/or adjusted in accordance with the various anticipated loads to be potentially encountered in a variety of applications.

With reference to the package configurations shown in FIGS. 5-11, the various components comprise a plurality of materials of differing properties. The percentage of load transmitted to the sensing element(s) 300 can depend on the stiffness of the materials forming the two parallel load paths through the hardware stack: one through the sensor assembly 500 and one around the sensor assembly 500, as previously described with reference to FIG. 10. A primary deforming element is the epoxy washer 530, and the stiffness of each component in components 500, 300, etc., can depend on the Young's modulus for each material (epoxy, steel, Si, etc.), the thickness of each component, and the area over which the load acts at each component.

At the interface(s) between the sensor assembly 500, the washer 1010 and and the support 910, a portion of the load is carried by the sensor assembly 500 and a portion by the surrounding support 910. The same deformation occurs in the Si sensing element 300 as the steel in the surrounding support 910, but a greater load is carried by the steel, primarily because it has much more area under load. The fraction of load carried by the sensing element 300 and that carried by the surrounding steel structure 910 can be calculated according to:

$$P_{App} = P_{SI} + P_{ST} \quad \text{Eqn. 6}$$

where $P_{App}$ is the total load applied to the sensing element 300 and the support 910, $P_{SI}$ is the portion of the load passing through the sensing element 300, and $P_{ST}$ is the portion of the load passing through the support 910. Ignoring any difference in height between the sensor assembly 500 (e.g., comprising sensing element 300) and the support 910, which would be eliminated by a preload procedure as previously described, it can be considered that the die and substrate are at the same height and subject to the same total applied load. The sensor assembly 500 and the support 910 can deform the same amount ($\delta$), but the stiffer structure will carry a larger proportion of the applied load.

$$F = k\gamma \quad \text{Eqn. 7}$$

$$k = EA/L \quad \text{Eqn. 8}$$

$$\gamma = F/k = F \cdot L/E \cdot A \quad \text{Eqn. 9}$$

In the preceding set of equations, F=P is the applied force or load, k is spring stiffness, E is Young's modulus, A is area, and L is length. Therefore, since $\delta$ is the same for the steel support 910 and the Si parts of the sensor assembly 500:

$$\delta_{ST} = \delta_{SI} = \left[\frac{P_{ST} \cdot L}{E_{ST} A_{ST}}\right] = \left[\frac{P_{SI} \cdot L}{E_{SI} A_{SI}}\right] \quad \text{Eqn. 10}$$

L is the same for the steel and Si and is equal to the thickness of the sensor assembly 500. Therefore:

$$P_{ST} = P_{SI} \cdot \left[\frac{E_{ST} A_{ST}}{E_{SI} A_{SI}}\right] \quad \text{Eqn. 11}$$

$$P_{App} = P_{SI} + P_{SI}\left[\frac{E_{ST} A_{ST}}{E_{SI} A_{SI}}\right] \quad \text{Eqn. 12}$$

$$P_{SI} = P_{App}\left\{\frac{E_{SI} A_{SI}}{E_{SI} A_{SI} + E_{ST} A_{ST}}\right\} \quad \text{Eqn. 13}$$

$$P_{ST} = P_{App}\left\{\frac{E_{ST} A_{ST}}{E_{SI} A_{SI} + E_{ST} A_{ST}}\right\} \quad \text{Eqn. 14}$$

The fractional load $P_{Si}$ applied to the Si, can be used to calculate a sensor response change in output voltage, $\Delta V_{out}$ for a given applied load. First, the distributed load on the sensor assembly 500 is calculated, which is then utilized to calculate the strain at the edge E of the sensor plate 310:

$$w = \frac{P_{SI}}{A_{SI}} \quad \text{Eqn. 15}$$

$$\epsilon_R = \frac{3r^2 w}{4t^2 E_{SI}} = \frac{3r^2 P_{SI}}{4t^2 E_{SI} A_{SI}} = \frac{3r^2 P_{App}}{4t^2}\left[\frac{1}{E_{SI} A_{SI} + E_{ST} A_{ST}}\right] \quad \text{Eqn. 16}$$

$$\Delta V_{out} = \frac{R_2}{(R_1 + R_2)^2} V_{in} \Delta R_1 = \frac{R_2}{(R_1 + R_2)^2} V_{in} G R_1 \epsilon_R$$

$$= \left[\frac{R_1 R_2}{(R_1 + R_2)^2}\right][V_{in} G]\left[\frac{3r^2 P_{App}}{4t^2}\right]\left[\frac{1}{E_{SI} A_{SI} + E_{ST} A_{ST}}\right] \quad \text{Eqn. 17}$$

$$\Delta V_{out} = \left\{\left[\frac{R_1 R_2}{(R_1 + R_2)^2}\right][V_{in} G]\left[\frac{3r^2}{4t^2}\right]\left[\frac{1}{E_{SI} A_{SI} + E_{ST} A_{ST}}\right]\right\} P_{App} \quad \text{Eqn. 18}$$

Based upon the previous equations and exemplary embodiments, the following presents an exemplary determination for a maximum load that can be applied without sensor failure due to excessive stress at the edge E of the plate 310. The following further presents an exemplary method for measuring the sensitivity of sensor assembly 500 in terms of voltage change per unit input load.

The failure stress for the plate 310 in bending is approximately 500 MPa and the Young's modulus is 170 GPa. In an exemplary embodiment, the plate 310 can be 100 microns thick and 1 mm in diameter. With reference to Eqns. 1 and 2 the distributed load that can cause the failure stress to be reached at the edge E of plate 310 can be determined to be:

$$w = 2.7 \times 10^7 \text{ N/m}^2 \text{ (27 MPa, 3970 lbf/in}^2\text{)}.$$

It is to be appreciated that w is the distributed load on the plate 310 transmitted through the sensor assembly 500, not the load on the support 910 which is to be determined. The associated maximum radial strain at the edge E of the plate 310 can be calculated from Eqns. 1 and 2, and the maximum change in resistance from Eqn. 3 for $R_1 = 40$ kOhm.

$$\epsilon_R = 0.0029, \Delta R_1 = 2 \text{ kOhm}$$

It is to be noted that either a thicker plate region 312 or a smaller diameter plate can be utilized to increase the determined maximum load. However, this could result in a loss in sensor response signal, hence, a design compromise can be made to determine the desired combination of high maximum load and high sensitivity.

For the exemplary design presented herein (e.g., FIGS. 3-10), assuming four sensing elements 300 included in sensor assembly 500 of size 2 mm by 1.4 mm:

$$A_{SI} = 4(2 \times 10^{-3})(1.4 \times 10^{-3}) = 1.1 \times 10^{-5} \text{ m}^2$$

The steel area of support 910 is:

$$A_{ST} = 2.5 \times 10^{-4} - 1.2 \times 10^{-5} = 2.4 \times 10^{-4} \text{ m}^2$$

for a 19.1 mm (0.75 inch) OD steel support washer 910 with a 6.35 mm (0.25 inch) diameter ID, and four cutouts 920 slightly larger than 2 by 1.4 mm to accommodate the sensor assemblies 500:

$$E_{SI} = 170 \text{ GPa and } E_{ST} = 200 \text{ GPa}$$

Per the Eqns. 13 and 14 above:

$$P_{ST} = 0.96 P_{App} \text{ and } P_{SI} = 0.04 P_{App}$$

For an evenly distributed load over the support washer 910 one fourth of this load is on each sensor assembly 500 (e.g., each of the four sensing elements 300), 0.01 $P_{App}$ per die. It was previously calculated that a distributed load of $2.7 \times 10^7$ N/m2 over the die will lead to sensor plate fracture for a 100 μm thick, 1 mm diameter Si plate 310, accordingly:

$P_{SI\text{-}failure}=(2.7\times10^7)(1.1\times10^{-5})=300\text{N}$ (68 lbf), across all four sensing elements 300.

$P_{SI\text{-}failure,per\ die}=75\text{N}$ (18 lbf), per each sensing element 300.

$P_{App}=300/0.04=7500\text{N}$ (1700 lbf)

applied to the support washer 910 for sensor die failure. In terms of the normal stress on the full area of support washer 910 this corresponds to:

$$\sigma_{washer} = \frac{7500}{2.5\times10^{-4}} = 30\text{ MPa}(4400\text{ lbf/in}^2)$$

The sensitivity of the output voltage to this applied load can be calculated from Eqn. 18:

$\Delta V_{out}=0.1$ V, for 7500 N applied, $1.33\times10^{-5}$ V/N, 13.3 mV/kN, (59 mV/klbf)

where $V_{in}=9$V, $G=18$, $R_1=43.8$ kOhm, $R_2=33.6$ kOhm, $r=500$ $t=100$ μm, $E_{SI}=170$ GPa, $E_{ST}=200$ GPa, $A_{SI}=1.1\times10^{-5}$ m², $A_{ST}=2.4\times10^{-4}$ m² for the calculations above.

Sensors, as shown in FIGS. 5-11, were loaded quasi-statically in compression and sensor response curves as a function of applied load were generated. The sensor response calibration from the test data was used in dynamic tests using a Split-Hopkinson bar test apparatus to determine measured load during high load rate testing. In addition, maximum load at failure was determined experimentally.

Figure 15:
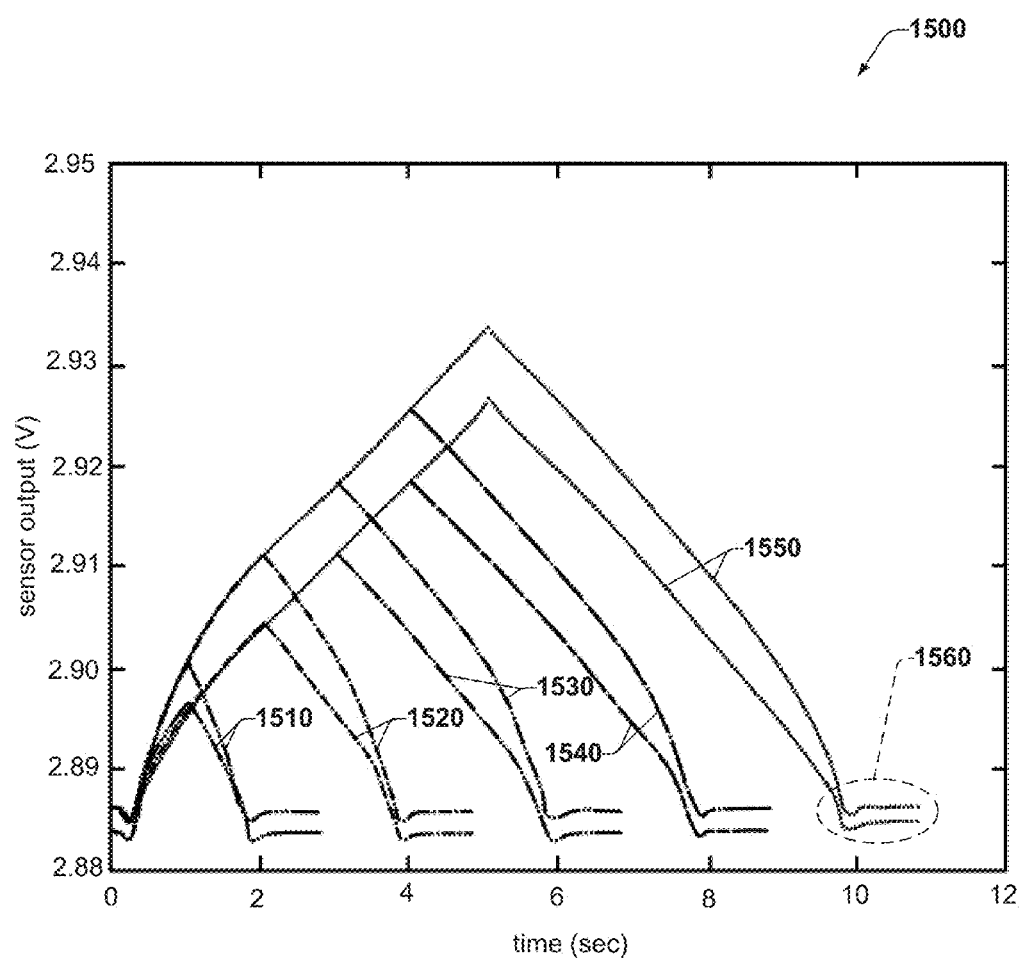
FIG. 15 presents a chart representing testing data for quasi-static compressive loads for a number of sensing elements, according to an embodiment.

FIG. 15 presents chart 1500, representing testing data for quasi-static compressive loads for a number of sensing elements. FIG. 15, plots 1510-1550 represent time vs. $V_{out}$, for a plurality of load inputs, 1000 lbf (4445 N) as shown in plot 1510, 2000 lbf (8890 N) as shown in plot 1520, 3000 lbf (13335 N) as shown in plot 1530, 4000 lbf (17780 N) as shown in plot 1540, and 5000 lbf (22230 N) as shown in plot 1550.

As shown in respective plots 1510-1550, the load inputs ramp up linearly to the respective maximum level (e.g., 1000 to 5000 lbf) in 1 to 5 seconds. Further, as shown, after reaching a defined maximum, the loads return back to zero load in a symmetrical manner. The measured sensor response(s) was repeatable. At loading and unloading rates of between 10 to 100,000 lbf/sec (44.45 to 4.445×105 N/sec) almost identical response curves result. The loading rates presented in FIG. 15 correspond to a minimum signal period of 10 msec and bandwidth of ~100 Hz, which can be considered to be equivalent to a quasi-static test condition.

The presented data was measured for two of the four sensors (e.g., two of four sensor assemblies 300) located on an epoxy washer 630, where each upper line in the load pairing is the load measured on a first sensor assembly 300, and where each lower line in the load pairing is the load measured on a second sensor assembly 300. For the arrangement shown in FIG. 6, all four sensor assemblies 300 showed similar responses to the two presented in FIG. 15, but with different offset voltages. As shown in FIG. 15, the resulting signals 1510-1550 have a low noise with a S/N ratio of 100:1, facilitating measurement resolution of approximately 100 N. As depicted at 1560 (and similarly for all the plots 1510-1550) there is a no-response section of the curve(s) during which the slack in the testing equipment is taken up, and followed by a steeper rise in response at the low load levels as gaps in the sensor package 1110 are closed and the full washer area is engaged. Initially at low load levels a larger fraction of the load is borne by the Si plate 310, however, once the gaps in the sensor package 1110 are compressed out the sensor response is approximately linear.

Figure 16:
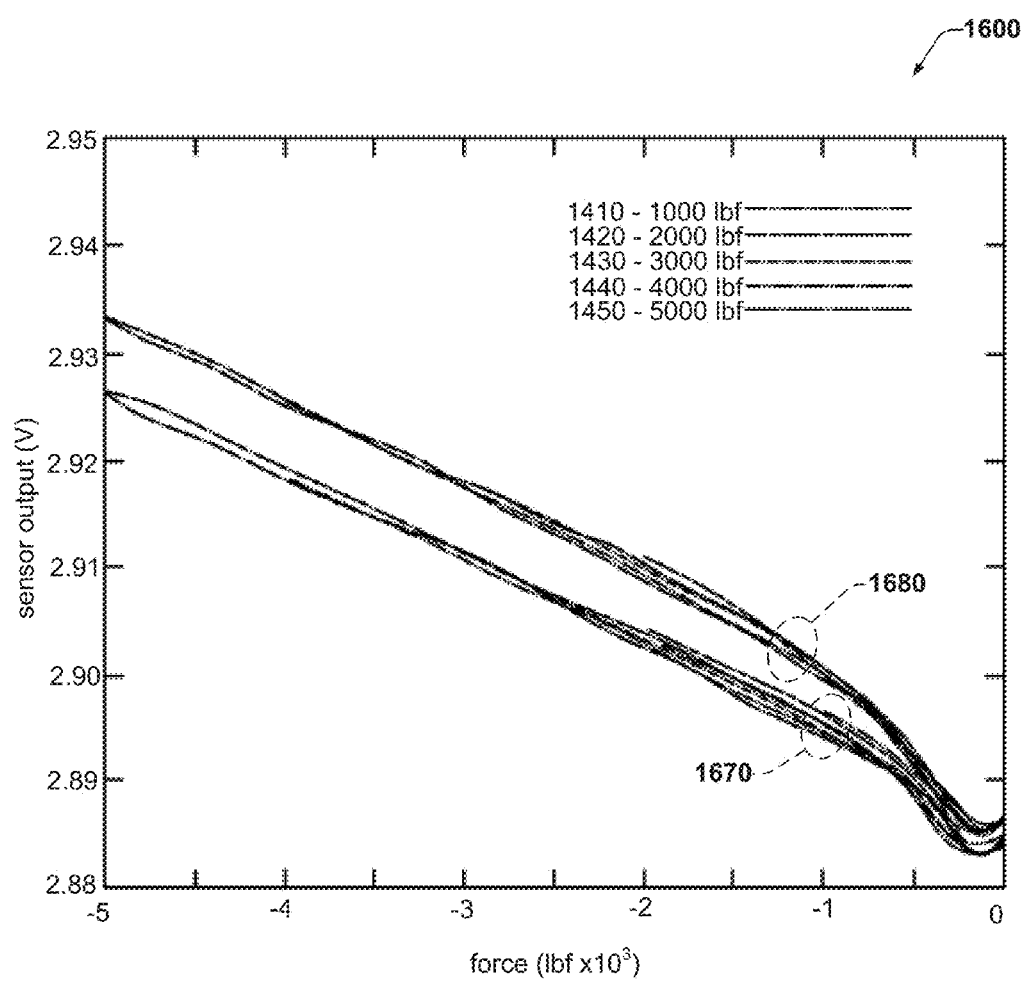
FIG. 16 presents a chart representing testing data for quasi-static compressive loads for a number of sensing elements, according to an embodiment.
Figure 17:
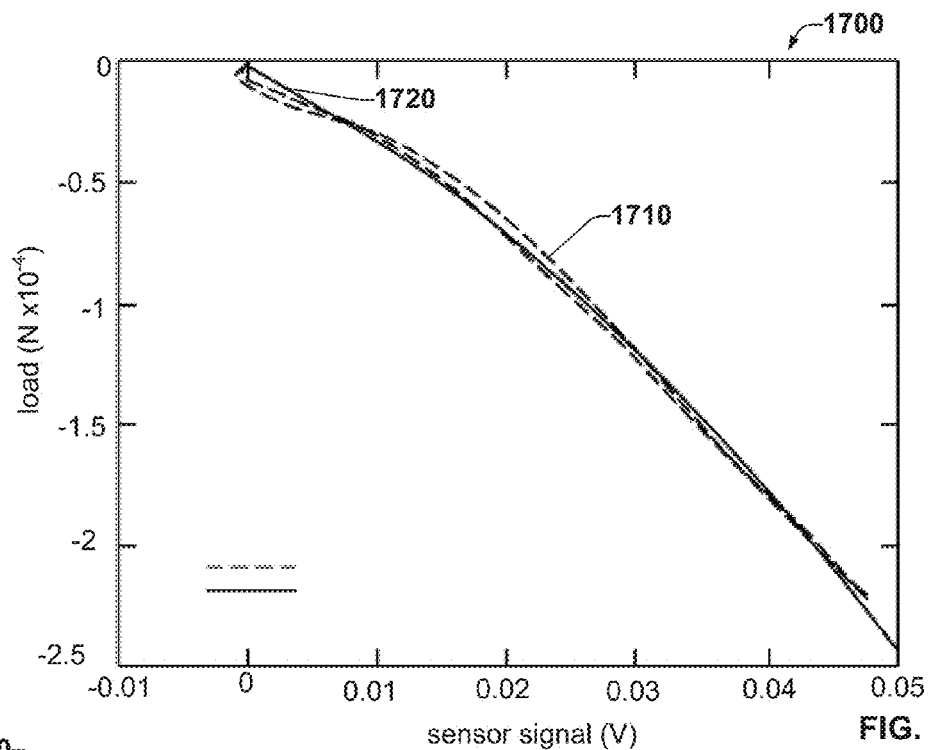
FIG. 17 presents a calibration curve for a sensor, according to an embodiment.
Figure 18:
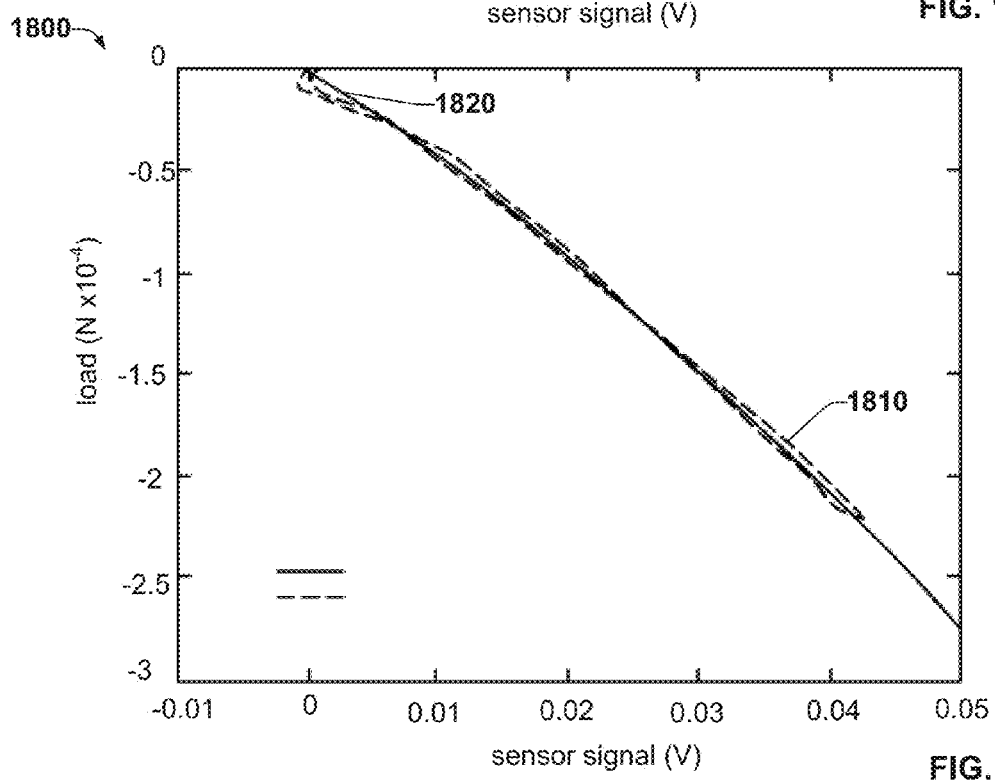
FIG. 18 presents a calibration curve for a sensor, according to an embodiment.

FIG. 16 shows the same data as that presented in FIG. 15 but plotted as load versus sensor output (V), where curves in group 1670 are for the first sensor 300 and the curves in group 1680 are for the second sensor 300. As shown, hysteresis is small. If the initial low load parts of the curves are ignored the response is linear with a slope of approximately 7 mV/1000 lbf mV (1.57 mV/kN) for both sensing elements 300. The sensing elements 300 depicted were identical designs with a plate diameter of 1 mm and a thickness of approximately 100 μm. Calibration curves from this data (sensors 1 and 4) are shown in FIGS. 17 and 18 based on a quadratic curve fit (e.g., $2^{nd}$ order least squares polynomial fit) and were used to measure loads during dynamic testing at much higher load rates. FIG. 17, plot 1710 presents the data while plot 1720 is the calibration curve (quadratic curve fit). FIG. 18, plot 1810 presents the data while plot 1820 is the calibration curve (quadratic curve fit).

The test data from the dynamic tests was generated using a Split-Hopkinson bar apparatus. Briefly, the Split-Hopkinson bar utilizes a gas-gun to drive a projectile into a long steel rod and impart a shaped shock pulse along the rod. A pulse shaper (typically a copper disk) at the impact point of the projectile on the incident bar is utilized to shape the pulse, imparting, for example, a square wave or triangle wave pulse. The test sample (e.g., a sensor assembly 600 containing the sensing elements 300) is placed at the end of the incident bar opposite the projectile impact. Two configurations were tested, a direct load configuration and a preloaded protected sensor configuration in which the sensor assembly 600 is inside the protected housing of sensor washer 1110.

Figure 19:
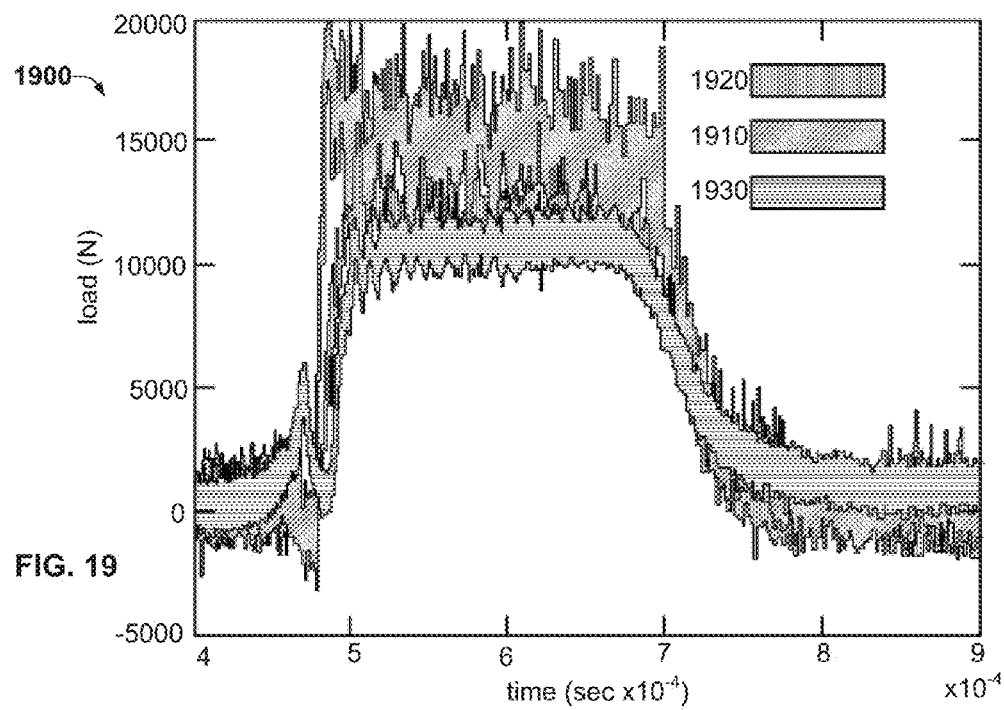
FIG. 19 presents a chart illustrating measured forces for a square wave pulse input, according to an embodiment.
Figure 20:
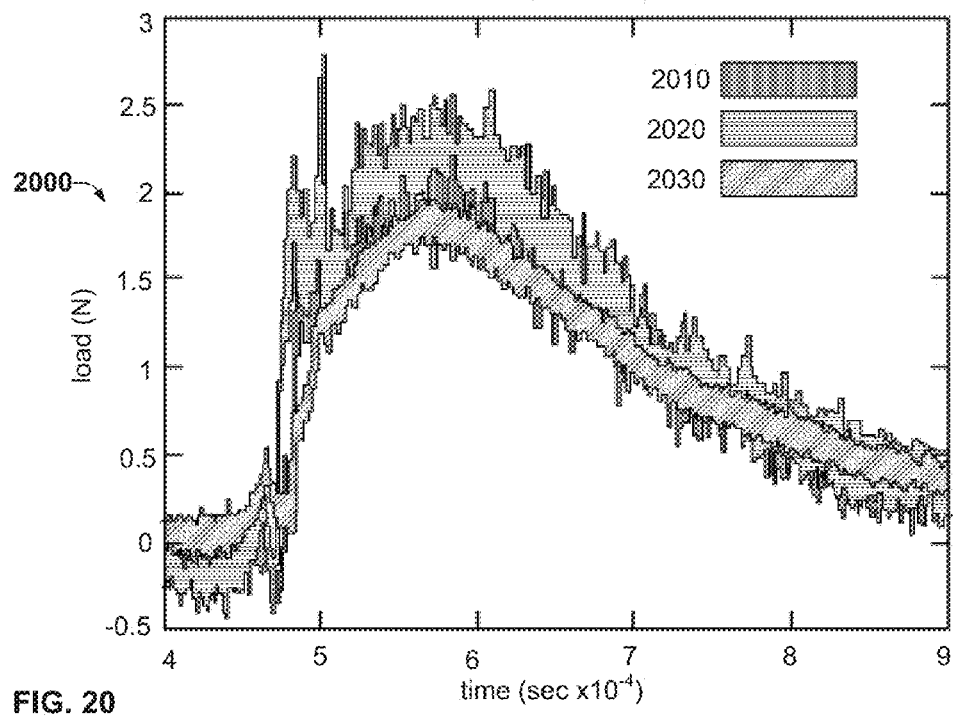
FIG. 20 presents a chart illustrating measured forces for a triangle wave pulse input, according to an embodiment.

The calibration curves from the quasi-static testing were utilized to convert $V_{out}$ recorded (e.g., on a high speed digital oscilloscope) into force for the data shown in FIG. 19 (a square wave pulse input) and FIG. 20 (triangle wave pulse input). FIG. 19, plot 1910 is the data measured for the first sensor 300, plot 1920 is the data measured for the second sensor 300, and plot 1930 is the data measured from a quartz-based calibration load cell. FIG. 20, plot 2010 is the data measured for the first sensor 300, plot 2020 is the data measured for the second sensor 300, plot 2030 is the data measured from a quartz-based calibration load cell. As shown in FIGS. 19 and 20, the first and second sensors 300 matched the calibration data from the load cell, plots 1930 and 2030.

A degree of noise is present for the sensor element 300 signals as well as the quartz load cell. The noise can be due to both electronic and mechanical sources. Ringing and overshoot at the front of the measured pulse are evident for both the quartz gage and the sensor elements 300. Overshoot is more pronounced for the sensor elements 300. An approach to clean up the sensor elements 300 signals was to apply a low level preload (approximately 2 kN) to the sensor washer 1110. Such an approach can remove any slack internal to the sensor washer 1110 and further, move the sensor elements 300 signals from the quadratic to the linear region on the calibration curve, as well as reduce mechanical noise sources.

Figure 21:
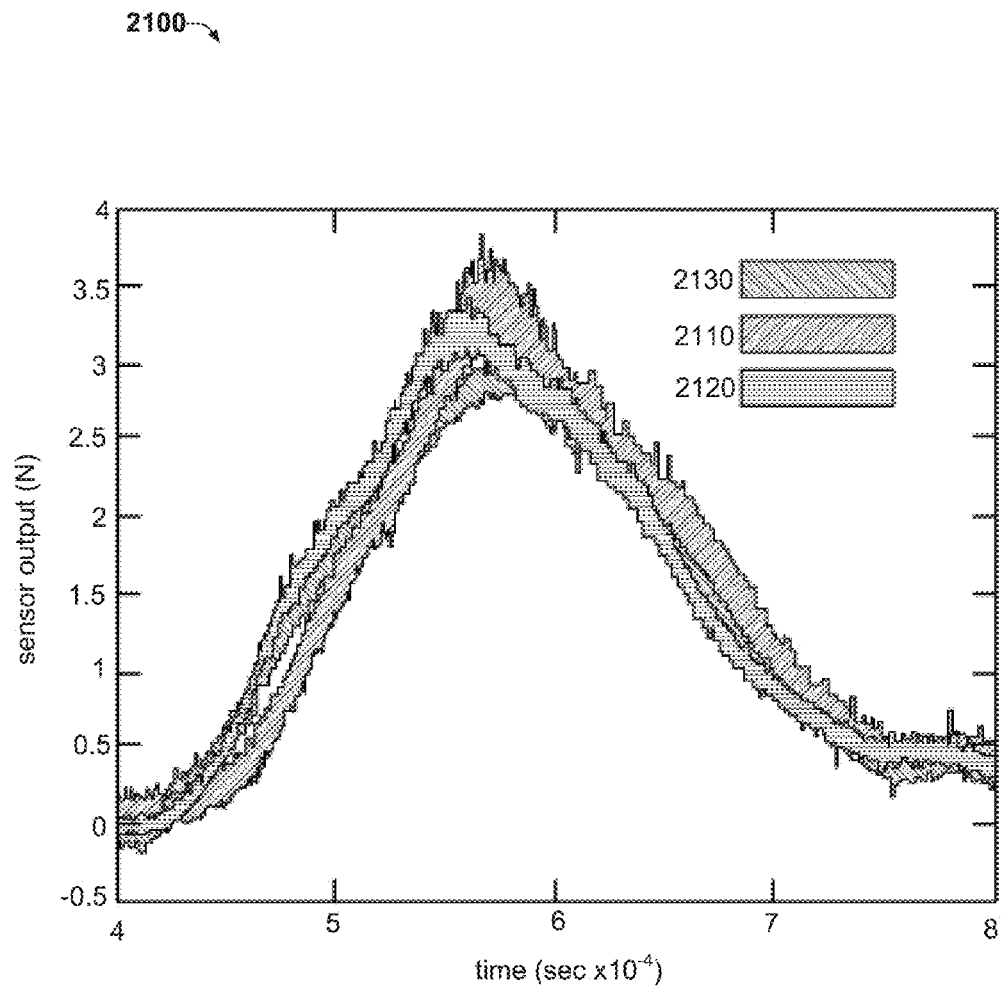
FIG. 21 presents a chart for a triangle shaped pulse with an applied preload, according to an embodiment.

In some of the samples tested, the sensor washer 1110 was still in a state of compression after preload. FIG. 21 presents a chart 2100 for a triangle shaped pulse with the preload. FIG. 21, plot 2110 is the data measured for the first sensor element 300, plot 2120 is the data measured for the second sensor element 300, and plot 2130 is the data measured from the quartz-based calibration load cell.

The noise on signals from the sensor elements 300 was significantly reduced and the overshoot at the front of the pulse measurement was eliminated. The square wave pulse (as shown in FIG. 20) was similarly cleaned up by preloading. Further, electronic noise sources were not cleaned up, specifically 60 Hz noise, as is present in FIG. 19 or 20. If electronic noise sources were reduced (e.g. with a 60 Hz filter) a measurement resolution similar to that shown for the quasi-static data (e.g., per FIG. 16) can be achievable. A peak load of 35,000 N (7900 lbf) was measured, as shown in FIG. 21, which corresponds to a stress at the sensor washer of about 140 MPa (20 ksi). Further, elimination of the squared term in the calibration curve (not shown) brought the preloaded MEMS sensor data to closer agreement with the quartz calibration sensor. A signal rise time of about 10 μsec was tracked by the sensors (FIGS. 18 and 19) corresponding to a maximum demonstrated frequency of about 100,000 Hz.

The test results indicate the failure load was about 5 times higher than expected (>35000 N measured vs 7500 N predicted ($P_{APP}$)) and the sensor response was 8 times lower than expected (1.57 mV/kN measured vs 13.3 mV/kN predicted). The predicted load failure was based on an oversimplification of the physical situation and hence was purposely conservative. It was anticipated that the sensor response curve would approximately track the load since the strain and output voltage track the stress at the edge E of the plate 310. A key oversimplification for the previously presented design calculation was the application of a fixed/fixed boundary condition. In the sensor package the thick steel in die mount 910 in contact with a sensing element 500 would not allow much deformation and would tend to produce a fixed boundary. It is to be noted that in the data shown, e.g., FIGS. 16-21, a thin (0.001 inch, 0.0254 mm) layer of polyimide tape (a relatively soft material) was placed in between the PCB 530 and the die mount 910 to provide some measure of wear protection. This soft material would tend to make the boundary more compliant (less fixed). Also the PCB 530 at the edge of the sensor plate contacting the thicker section of the sensing element 300 is a softer material that would allow some deformation. Hence, the boundary condition at the edge of the sensor plate may be improved by modeling as somewhere between a fixed boundary and a simply supported boundary in which the slope at the edge of the plate is not assumed zero. For a simply supported circular plate the edge stress is zero, so any flexibility at the edge E of the plate 310 would tend to reduce the stress, increase the maximum achievable load, and reduce the signal output. For a simply supported plate it would be better to have the piezoresistive strain sensing elements at the center of the plate rather than the edges.

The maximum survivable load may be under-predicted and the sensor response may be overpredicted may be due to the effect of the etch fillet radius FR at the edge E of the sense plate 310 is not modeled in the design calculation previously described. As shown in FIG. 13 a sharp corner at the edge FR of the sense plate 310 causes a stress concentration resulting in plate stresses beyond the fracture limit for Si in bending. As previously mentioned, a radius at this location will reduce this stress concentration leading to a higher load required for fracture, less strain, and therefore less sensor response voltage.

As previously mentioned, a micro-preload can be applied to the sensor assembly 1110, for example to compensate for the various components comprising assembly 1110 are not tightly packed when assembly 1110 is first assembled. Specifically parts of the load path may be in contact while other parts are not. An amount of preload can be required to compress the initially contacted parts of the washer assembly 1110 enough to bring the full washer area into contact in order to achieve full load division. In particular the die stickup (FIG. 5, distance M) may be such that the assembly 510 is in contact with the die mount 910 while the surrounding PCB 530 is not. The sensor plate 310 can initially carry the entire load as the sensor washer 1010 is compressed enough until the PCB 530 comes into contact with the die mount 910. A function of the sensor plate 310 initially carrying the entire applied load can account for the initially higher slope of the load response curves (quadratic term in the calibration equations). In an embodiment, a small amount of preload can be applied to cause the entire areas of the respective components 910, 530 and 310 to contact and the sensor response to enter the linear range. Owing to the ability to monitor sensor response voltage during the preload process (per FIGS. 17 and 18) it is possible to determine how much preload is required to compress the various components comprising sensor assembly 500 and thus determine when enough micro-preload has been applied for complete contact.

As previously described (e.g., per Eqn. 1) the sensor survival load is most sensitive to a thickness of thinned region 312 versus plate thickness 310, and further a radius J of the thinned region 312, per FIG. 3. Reducing the plate radius J or increasing the thickness of thinned region 312 can result in significantly higher maximum achievable loads (squared functionality for both parameters). However, such an approach can lead to a loss of sensor response (per. Eqn 18). In addition, reducing the percentage of load carried by the sensor plate 310 and thinned region 312 by decreasing the size of the die mount 910 and increasing the stiffness of the surrounding materials (e.g. Tungsten, E=400 GPa, instead of Steel, E=200 GPa) can increase the maximum achievable load before sensor plate failure, but with a linear functionality (per Eqns. 1, 13 and 14).

An approach to increase sensor response for a given strain is to increase the number of strain-sensitive 'wires' (e.g., traces 320 and 330) on the surface of the thinned sensor region 312 and position the wires more precisely at the maximum strain locations on the plate 310. For instance, for a calculation to accurately determine the plate deformation in terms of fixed vs. simply supported boundary conditions, an approach may be to place the highest density of 'wires' more at the center of the thinned region 312 than at the edge E. The number of wires can be more densely patterned than that shown in FIG. 3 owing to the traces being photolithographically patterned much thinner and closer together in order to increase $R_1$ and $R_2$ (e.g., as defined in Eqn. 18) and thereby increase sensor output voltage for a given load. Hence, in an embodiment, to achieve a more sensitive, higher maximum load sensor can involve increasing the radius J to provide more area for piezoresistive 'wires' (a denser pattern of traces at the optimum radial location micromachined at the limit of photolithographic precision), while at the same time increasing the thickness of the thinned region 312 such that the plate 310 can handle a higher load.

FIG. 22 presents a sensor apparatus 2200, in accord with an embodiment. As shown, the load sensor 120 can be placed where the washer 150 is located in FIGS. 1 and 2. By locating the load sensor 120 between the bolthead 131 and the support structure 110, a compressive load applied to the outer surface 134 of bolthead 131 can be measured directly at sensor 120. It is to be appreciated that while the various embodiments presented herein are directed towards an arrangement whereby a load sensor 120 is located on a boltshaft 133 of a bolt 130, the various embodiments are not so limited and can be directed towards any configuration which can utilize at least one Si sensing element and associated structure(s) as presented herein. For example, the sensing elements 300 can be incorporated into a system whereby the sensing element(s) 300 are positioned between two plate structures which maintain a compressive load on the sensing element(s) 300 during operation.

Figure 23:
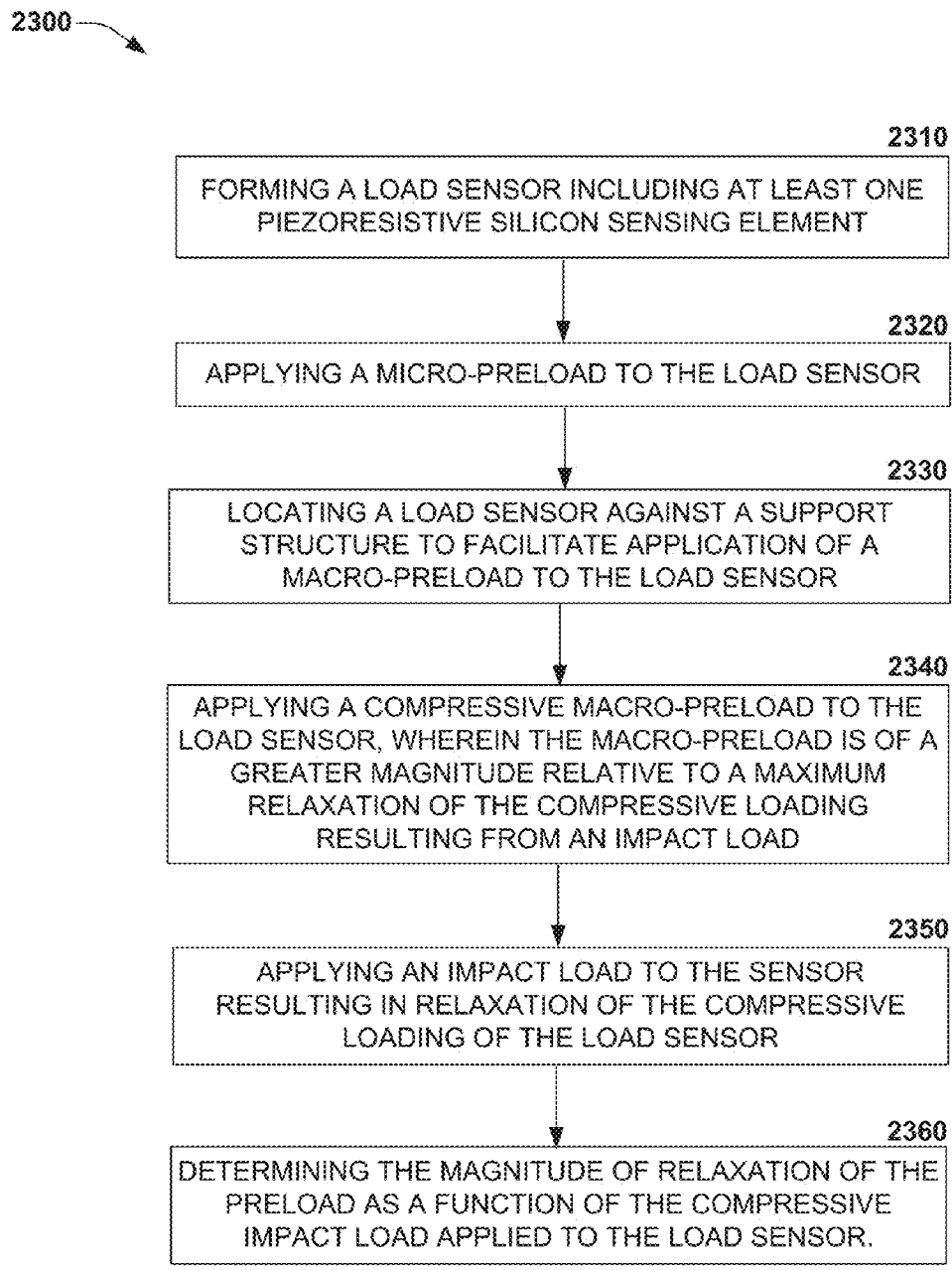
FIG. 23 is a flow diagram illustrating an exemplary, non-limiting embodiment to facilitate measurement of an impact load based upon a relaxation of a compressive load.
Figure 24:
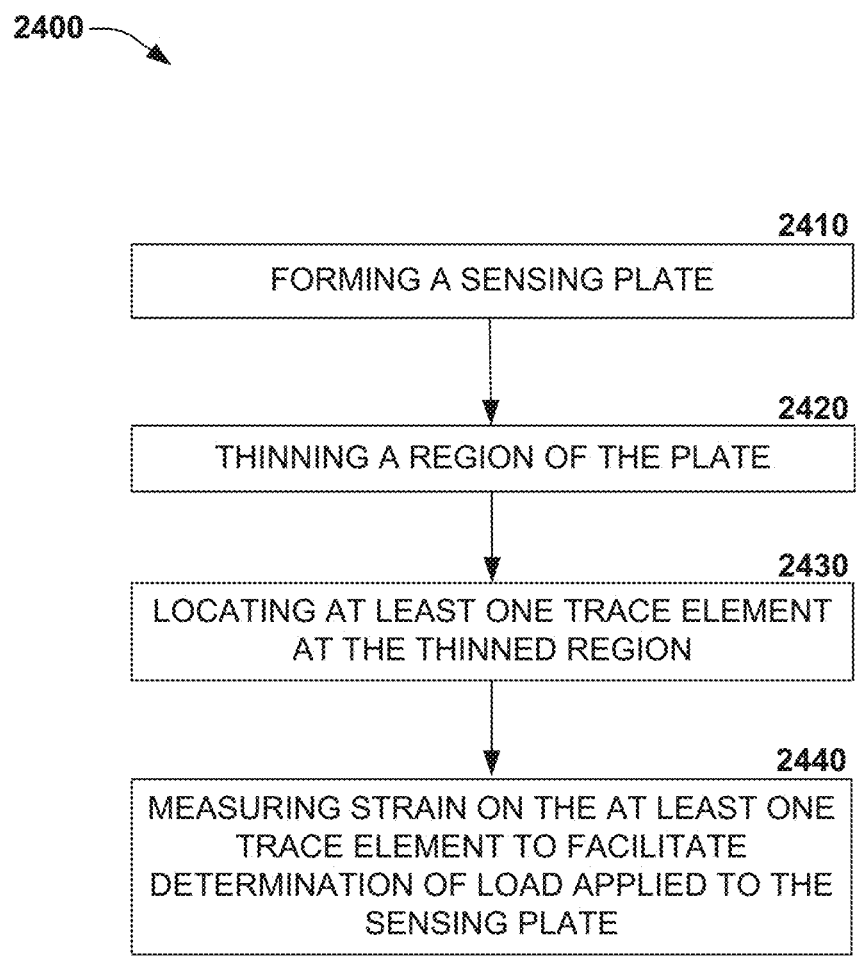
FIG. 24 is a flow diagram illustrating an exemplary, non-limiting embodiment to fabricate a load sensing component.

FIGS. 23 and 24 illustrate exemplary methodologies relating to a sensor which can measure and survive shock loading while still providing a high signal/noise ratio with significant bandwidth are presented. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 23 illustrates a methodology 2300 relating to a sensor which is subjected to a compressive preload and can measure and survive shock loading while still providing a high signal/noise ratio with significant bandwidth are presented, according to an embodiment. As previously mentioned, a preload can be applied to the sensor, whereby during operation of the sensor, the magnitude of the preload can be reduced as a function of the applied operational load. With knowledge of the preload amount, and the final preload during sensor operation, the magnitude of the applied operational load can be determined.

At 2310, a load sensor can be formed and include at least one piezoresistive sensing element. As previously described, the sensing element can be formed from Si. A concern with Si elements is their inherent brittleness in the presence of a tensile stress, a concern which can be addressed by application of a compressive preload on the Si sensing element. Based, at least in part, upon the application, the sensing element can be placed in a containing structure which can protect the sensing element(s) as well as also containing other material components which can minimize impact stresses that could cause fracture of the sensing element. In an embodiment, the load sensor can be utilized in a configuration where the load sensor is supported on a boltshaft, where the load sensor is in the form of a washer. To facilitate determination of application of loading in a number of directions (e.g., off-center loading) relative to the load sensor, the load sensor can be formed with a plurality of sensing elements, e.g., four sensing elements to facilitate load determination in four directions (e.g., effectively cardinal directions) relative to the position of the load sensor on the boltshaft. The containing structure can be formed from steel. Further, the material components can be placed either side of the sensing element(s) to provide a degree of compliance to the load sensor. The materials can be formed from any ductile and/or compliant material, as previously described herein.

At 2320, a micro-preload can be applied to the load sensor. The micro-preload can act to compensate for the various components in the load sensor not being tightly packed during assembly of the load sensor, e.g., parts of a load path may be in contact while other parts are not. As previously described, an amount of preload can be applied to compress initially contacted parts of the load sensor to achieve full load division between the plurality of sensing elements, and hence facilitate a linear sensing response.

At 2330, as previously described particularly with reference to FIGS. 1 and 2, the load sensor can be located on a support structure which can be utilized to locate the load sensor relative to a component to be sensed, and also to apply a macro-preload to the load sensor. A support structure can be a nut and bolt, onto which the load sensor is located, whereby the bolt is located in a recessed portion of the component to be sensed, e.g., a countersunk hole in a wall of the component to be sensed. A plurality of spacing components, e.g., washers, can be utilized to facilitate load absorption during operation of the load sensor. The washers can be formed from ductile and/or compliant material.

At 2340, a macro-preload can be applied to the sensor, where, in an embodiment, the macro-preload can be of a magnitude greater than an anticipated maximum load to be experienced during operation of the load sensor. The macro-preload can be several times greater than the micro-preload. For example, with the exemplary embodiment, a compressive macro-load can be applied to the load sensor, e.g., by tightening of the nut on the bolt, where the loading results in tensile stress being applied to the boltshaft, the tensile stress can be equal but of opposite magnitude to the compressive macro-load.

At 2350, during operation a load can be applied to the bolthead which can act to force the boltshaft in an inward direction relative to the component wall. Accordingly, owing to the boltshaft moving in a direction opposite to the loading direction of the nut and bolt, the compressive load resulting from the compressive macro-preload is reduced.

At 2360, the amount by which the compressive preload reduced can be determined, thereby enabling determination of the magnitude of the load applied to the bolthead.

FIG. 24 illustrates a methodology 2400 relating to fabricating a sensor with a thinned region to facilitate concentrating a load at the thinned region. At 2410, a plate can be formed to act as a sensing plate. In an embodiment, the plate can be formed from Si. In another embodiment, the plate can have a thickness of about 100 µm.

At 2420, a portion of the sensing plate can be thinned. The thinned region can be of any suitable thickness, e.g., about 10 µm thick, to facilitate a higher degree of strain occurring in the thinned region during loading than occurs in the un-thinned portion of the plate. The thinned region can be formed by any suitable operation, such as an etching operation. Further the thinned region can have a circular configuration.

At 2340, at least one trace element can be formed over the thinned region.

The trace(s) can form a Wheatstone bridge, or similar circuit system, where, in an embodiment, the trace(s) can be of a circular serpentine pattern configured to operate over the thinned region. Appropriate connections, wiring, etc., can be attached to the trace(s). The sensing plate with the traces formed thereon can be located in a load sensor, as previously described.

At 2440, the load sensor can be incorporated into a load sensing system. During application of a load to the load sensor, a strain can be created at the thinned region owing, in part, to the difference in thickness between the thinned region and the rest of the thicker plate. The strain at the thinned region can further induce strain in the trace(s) which can accordingly affect the voltage, etc., across the Wheatstone bridge. Based upon the change in voltage on the Wheatstone bridge the reduction in compressive load on the plate can be determined and accordingly, the degree of applied load.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A load sensing system, comprising:
    a load sensor comprising a piezoresistive sensor; and
    a load application component configured to:
        locate the load sensor on a supporting structure;
        apply a compressive preload to the load sensor resulting in application of a compressive load to the piezoresistive sensor; and
        under an operational load, effect a relaxation in the compressive load on the piezoresistive sensor.

2. The load sensing system of claim 1, wherein the load application component comprises a nut and a bolt, the bolt comprising a bolthead, a boltshaft and a threaded portion of the boltshaft onto which the nut can be attached.

3. The load sensing system of claim 2, further comprising a first washer, a second washer and a third washer located on the boltshaft.

4. The load sensing system of claim 3, wherein:
    a hole extends through the supporting structure from an outer to an inner surface of said structure;
    the bolt is positioned such that the bolthead is situated proximal the outer surface and the boltshaft extends through the hole beyond the inner surface;
    the first washer is situated between the bolthead and the outer surface;
    the load sensor is situated on the boltshaft between the nut and the inner surface;
    the second washer is situated on the boltshaft between the inner surface and the load sensor; and
    the third washer is situated on the boltshaft between the load sensor and the nut.

5. The load sensing system of claim 1, wherein the piezoresistive sensor comprises a plate of silicon.

6. The load sensing system of claim 5, wherein the silicon plate includes a central region that has been thinned such that in use, strain is concentrated therein.

7. The load sensing system of claim 6, wherein the piezoresistive sensor includes at least one conductive pattern forming a Wheatstone bridge.

8. The load sensing system of claim 7, wherein the conductive pattern is composed, at least in part, of polysilicon.

9. The load sensing system of claim 7, wherein the conductive pattern is conformed such that a difference between the compressive preload and the operational load causes a measurable change in resistance across the Wheatstone bridge.

10. The load sensing system of claim 1, wherein the load sensor further comprising at least one washer, a die mount, and an outer shell, the die mount and outer shell are formed from steel, and the at least one washer is formed from at least one of aluminum, copper, nylon, a glass-reinforced epoxy laminate sheet, or a polyimide.

11. The load sensing system of claim 10, wherein the washer is located between the die mount and an inner surface of the outer shell, and the die mount includes an opening, the piezoresistive sensor is located in the opening such that a portion of the piezoresistive sensor extends beyond an outer surface of the die mount and contacts the at least one washer.

12. The load sensing system of claim 1, further comprising a load measurement component configured to measure a difference between the compressive preload and the operational load.

13. A load sensing system comprising:
    a load sensor setup; and
    a load application component configured to:
        apply a compressive preload to the load sensor setup resulting in an application of a compressive load to the sensor; and
        under an operational load, effect a relaxation in the compressive load on the sensor.

14. The load sensing system of claim 13, wherein the load application component comprises:
    a bolt, wherein the bolt comprises a bolthead and a boltshaft;
    a housing, wherein the bolthead rests on a portion the housing and the boltshaft extends through a hole in the housing; and
    at least one nut, wherein the load sensor setup is between the bolthead and the at least one nut, and wherein the at least one nut is fastened to the boltshaft such that the bolt is secured to the housing.

15. The load sensing system of claim 14, further comprising a first washer between the bolthead and the portion of the housing.

16. The loading sensing system of claim 14, further comprising a second washer between a terminus of the housing and the at least one nut.

17. A load sensing system comprising:
    a load sensor setup comprising a sensor; and
    a load application component configured to:
        induce a compressive load to the sensor; and
        under an operational load, effect a relaxation in the compressive load on the sensor.

18. The load sensing system of claim 17, wherein the load application component comprises:
    a bolt, wherein the bolt comprises a bolthead and a boltshaft;
    a housing, wherein the bolthead rests on a portion the housing and the boltshaft extends through a hole in the housing; and
    at least one nut, wherein the at least one nut is fastened to the boltshaft such that the bolt is secured to the housing, wherein the load sensor setup is between the bolthead and the at least one nut.

19. The load sensing system of claim 18, wherein a magnitude of the compressive load induced to the sensor setup by fastening the at least one nut to the boltshaft such that the bolt is secured to the housing is greater than a magnitude of the operational load.

20. The load sensing system of claim 18, further comprising a washer between the bolthead and the at least one nut.

* * * * *